US011931611B2

(12) United States Patent
Cray

(10) Patent No.: US 11,931,611 B2
(45) Date of Patent: *Mar. 19, 2024

(54) FLASH SUPPRESSOR FOR INHIBITING EXPLOSIONS

(71) Applicant: No Spill, LLC, Mission Hills, KS (US)

(72) Inventor: Thomas M. Cray, Mission Hills, KS (US)

(73) Assignee: No Spill, LLC, Mission Hills, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/014,826

(22) Filed: Sep. 8, 2020

(65) Prior Publication Data

US 2020/0406076 A1 Dec. 31, 2020

Related U.S. Application Data

(63) Continuation of application No. 16/042,816, filed on Jul. 23, 2018, now Pat. No. 10,792,525, which is a (Continued)

(51) Int. Cl.

| | |
|---|---|
| ***A62C 3/06*** | (2006.01) |
| ***B65D 25/38*** | (2006.01) |
| ***B67D 7/04*** | (2010.01) |

(52) U.S. Cl.

CPC ............ *A62C 3/065* (2013.01); *B65D 25/385* (2013.01); *B67D 7/04* (2013.01)

(58) Field of Classification Search

CPC ...... A62C 3/0065; A62C 4/00; B65D 25/385; B67D 7/04

(Continued)

(56) References Cited

U.S. PATENT DOCUMENTS

| | | | | |
|---|---|---|---|---|
| 642,787 A | 2/1900 | Eakin | | |
| 1,283,384 A * | 10/1918 | Weil | B65D 83/687 | 222/542 |

(Continued)

FOREIGN PATENT DOCUMENTS

| | | |
|---|---|---|
| CA | 705745 A | 3/1965 |
| FR | 1.135.244 A | 4/1957 |

(Continued)

OTHER PUBLICATIONS

IPR2020-00360 Petition for Inter Partes Review of U.S. Pat. No. 10,029,132, dated Dec. 29, 2019 (70 pages).

(Continued)

*Primary Examiner* — Lien M Ngo

(74) *Attorney, Agent, or Firm* — Lewis Rice LLC

(57) ABSTRACT

A portable fuel container configured to prevent liquid fuel contained therein from being entirely emptied from the container. The amount of liquid fuel retained in the container can be sufficient to maintain a fuel-to-air ratio in the container at a fuel-rich level that prevents combustion within the container if the container were to be placed near an ignition source or if an ignition source were to somehow enter the container. The container can also include other safety features such as, for example, a flash suppressor located at the fill opening, an extra wide fill opening, and/or an easily controllable dispensing spout. When a flash suppressor is employed, the perforations in the flash suppressor can be configured to retain fuel therein after fuel has been dispensed from the container and the flash suppressor is no longer submerged in fuel.

25 Claims, 14 Drawing Sheets

Related U.S. Application Data continuation of application No. 14/927,133, filed on Oct. 29, 2015, now Pat. No. 10,029,132, which is a continuation of application No. 14/487,893, filed on Sep. 16, 2014, now Pat. No. 9,174,075, which is a continuation-in-part of application No. 13/904,657, filed on May 29, 2013, now abandoned.

(60) Provisional application No. 61/754,266, filed on Jan. 18, 2013, provisional application No. 61/653,240, filed on May 30, 2012.

(58) Field of Classification Search
USPC .... 222/189.06, 204, 189.01, 189.07, 189.08, 222/189.11; 220/88.1, 88.286, 286.3, 220/734, 719, 88.3, 560.05; 210/172.6, 210/437
See application file for complete search history.

(56) References Cited

U.S. PATENT DOCUMENTS

| | | | | | |
|---|---|---|---|---|---|
| 1,814,656 | A | | 7/1931 | Anschicks | |
| 1,933,486 | A | * | 10/1933 | Simmonds | A62C 4/00 220/88.2 |
| 2,019,094 | A | * | 10/1935 | Rice | B01D 35/02 210/497.3 |
| 2,275,318 | A | | 3/1942 | Rasmussen | |
| 2,335,195 | A | | 11/1943 | Packer | |
| 2,733,775 | A | | 2/1956 | Dupure | |
| 2,755,971 | A | | 7/1956 | Lisciani | |
| 2,850,083 | A | | 9/1958 | Frost | |
| 3,770,160 | A | | 11/1973 | Flider | |
| 3,927,797 | A | * | 12/1975 | Flider | B65D 1/20 220/768 |
| 4,013,190 | A | | 3/1977 | Wiggins et al. | |
| 4,065,024 | A | * | 12/1977 | Atwell | B65D 25/385 220/203.1 |
| 4,249,669 | A | | 2/1981 | Szego | |
| 4,273,265 | A | | 6/1981 | Anderson | |
| 4,361,190 | A | | 11/1982 | Szego | |
| 4,489,860 | A | | 12/1984 | Flider | |
| 4,615,455 | A | | 10/1986 | Tansill | |
| 4,676,463 | A | | 6/1987 | Tansill | |
| 4,861,478 | A | * | 8/1989 | Hall | B01D 29/35 210/416.4 |
| 4,882,055 | A | * | 11/1989 | Stamstad | B01D 29/13 264/328.14 |
| 5,196,155 | A | * | 3/1993 | Askin | C21B 7/163 266/270 |
| 5,248,414 | A | * | 9/1993 | Perkins | B01D 17/0202 210/489 |
| 5,505,849 | A | * | 4/1996 | Rama, Jr. | B01D 35/04 210/172.6 |
| 5,540,285 | A | | 7/1996 | Alhamad | |
| 6,248,820 | B1 | * | 6/2001 | Nozaki | D06M 11/44 524/414 |
| 6,390,153 | B1 | * | 5/2002 | Flider | B65D 25/42 141/302 |
| 7,059,481 | B2 | | 6/2006 | Kochert et al. | |
| 8,029,667 | B2 | | 10/2011 | Santinon | |
| 8,567,646 | B1 | | 10/2013 | Cray | |
| 8,602,273 | B2 | | 12/2013 | Carter et al. | |
| 9,205,292 | B2 | | 12/2015 | Riordan | |
| 9,707,422 | B2 | | 7/2017 | Elias et al. | |
| 2003/0088000 | A1 | * | 5/2003 | Kimura | C08L 23/10 524/115 |
| 2006/0177729 | A1 | | 8/2006 | Campau | |
| 2011/0036763 | A1 | | 10/2011 | Santinon | |
| 2012/0312759 | A1 | | 12/2012 | Ries et al. | |
| 2013/0087581 | A1 | | 4/2013 | Jensen | |

FOREIGN PATENT DOCUMENTS

| | | | |
|---|---|---|---|
| GB | 19322641 | | 10/1913 |
| GB | 734674 | | 8/1955 |
| GB | 1341693 | A | 12/1973 |
| WO | 94/22536 | A1 | 10/1994 |
| WO | 2013/117921 | A1 | 8/2013 |

OTHER PUBLICATIONS

IPR2020-00360 Patent Owner's Preliminary Response to Petition for Inter Partes Review, dated Apr. 13, 2020 (60 pages).
IPR2020-00360 Exhibit 1003, Declaration of Samim Safaei in Support of Petition for Inter Partes Review of U.S. Pat. No. 10,029,132, dated Dec. 27, 2019 (94 pages).
IPR2020-00360 Exhibit 1004, Curriculum Vitae of Samim Safaei, as of Dec. 27, 2019 (2 pages).
IPR2020-00360 Exhibit 1005, Glen Stevick, et al., Portable Plastic Gasoline Container Explosions and Their Prevention (2010) (15 pages).
IPR2020-00360 Exhibit 1006, Glen Stevick, et al., Failure Analysis and Prevention of Fires and Explosions with Plastic Gasoline Containers, 11 J Fail. Anal. & Preven. 455 (2011) (11 pages).
IPR2020-00360 Exhibit 1007, John W. Mauger, An Experimental Analysis of the Effectiveness of Using 30×30 Steel Mesh Flame Screens to Prevent Flashbacks in Propane-Air Mixtures, Master's Thesis, Worcester Polytechnic Institute in partial fulfillment of the Requirements for the degree of Degree of Master of Science in Fire Protection Engineering (1997) (118 pages).
IPR2020-00360 Exhibit 1008, Lori C. Hasselbring, Case Study: Flame Arresters and Exploding Gasoline Containers, 130 J. Hazardous Materials 64 (2006) (5 pages).
IPR2020-00360 Exhibit 1010, Brian Elias, Hazard Assessment of Portable Gasoline Container Flammability, Master Thesis, Worchester Polytechnic nstitute, Digital WPI (2011) (55 pages).
IPR2020-00360 Exhibit 1011, Email from Lori Hasselbring attaching "ASTM F15.10 Meeting Agenda Items and Proposal" (Oct. 18, 2006) (36 pages).
IPR2020-00360 Exhibit 1012, Ali S. Rangwala & Robert G. Zalosh, Analysis of Mitigation Strategies Associated with Flame Propagation Within the Dour Spout of a Portable Gasoline Container, Worcester Polytechnic Institute proposal to ASTM (2011) (13 pages).
IPR2020-00360 Exhibit 1013, Email from Phil Monckton Re: Request to Circulate WPI Mauger Thesis to the Flame Arrestor Task Group (Nov. 11, 2011) (1 page).
IPR2020-00360 Exhibit 1014, Stanley S. Grossel, Deflagration and Detonation Flame Arrester Technology 77-138 (2010) (62 pages).
IPR2020-00360 Exhibit 1015, Air Res. Bd., Cal. Envtl. Prot. Agency, Proposed Regulations for Portable Fuel Containers: Refueling Spillage Control Project (1999) (20 pages).
IPR2020-00360 Exhibit 1017, Laurence G. Britton, Avoiding Static Ignition Hazards in Chemical Operations, Center for Chemical Process Safety of he American Institute of Chemical Engineers (1999) (254 pages).
IPR2020-00360 Exhibit 1018, Email from Joe Zicherman Re: ASTM F15:10 Flame Arrester Task Group Updates (Sep. 2, 2010) (37 pages).
IPR2020-00360 Exhibit 1019, Email from Joe Zicherman Re: F15.10 TG Activities—WPI Program (Feb. 3, 2010) (18 pages).
IPR2020-00360 Exhibit 1020, Email from Joe Zicherman Re: F15.10 Conference Call (Jul. 20, 2011) (14 pages).
IPR2020-00360 Exhibit 1021, Affidavit of Christopher Butler, Office Manager at the Internet Archive (Dec. 10, 2019) (4 pages).
IPR2020-00360 Exhibit 1022, Justrite, Brochure, Justrite Manufacturing (2010) (8 pages).
IPR2020-00360 Exhibit 1024, Ki Mae Heussner, With Modern Furnishing, Homes Burn Faster, ABC News (Jan. 31, 2011), https://abcnews.go.com/Technology/modernfurnishing-homes-burn-faster/story?id=12806666 (4 pages).

(56) References Cited

OTHER PUBLICATIONS

IPR2020-00360 Exhibit 1025, Log of Meeting, Directorate for Engineering Services, Meeting of ASTM 15.10 Technical Subcommittee on Flammable Liquid Containers (2010) (4 pages).
IPR2020-00360 Exhibit 1026, Email from Ali Rangwala Re: WPI response to concerns raised by Dr. Stevick {Nov. 30, 2010) (6 pages).
IPR2020-00360 Exhibit 1027, Ryan Quinn, Brian Elias Is Awarded the Jablonsky Scholarship, NFPA Today Blog {Aug. 7, 2014), https://community. hfpa.org/community/nfpa-today/blog/2014/08/07/brian-elias-is-awarded-the-jablonsky-scholarship (1 page).
IPR2020-00360 Exhibit 1029, Declaration of Jacob Robert Munford, dated Dec. 26, 2019 (148 pages).
IPR2020-00360 Exhibit 2001, W. M. Haynes, CRC Handbook of Chemistry and Physics, 92nd Edition (2011) (4 pages).
IPR2020-00360 Exhibit 2002, Myer Kutz, Applied Plastics Engineering Handbook: Processing, Materials, and Applications (2016) (4 pages).
IPR2020-00361 Declaration of Samim Safaei in Support of Petition for Inter Partes Review of U.S. Pat. No. 9,174,075, dated Dec. 27, 2019 (109 pages).
IPR2020-00361 Patent Owner's Preliminary Response to Petition for Inter Partes Review, dated Apr. 13, 2020 (67 pages).
IPR2020-00361, Paper 7, Decision Denying Institution of Inter Partes Review, dated Jul. 7, 2020, 11 pages.
IPR2020-00361, Exhibit 1002, File History of U.S. Appl. No. 14/487,893, filed Sep. 16, 2014, 224 pages.
IPR2020-00360, Paper 7, Decision Granting Institution of Inter Partes Review, filed Jul. 7, 2020, 15 pages.
Court of Appeals for the Federal Circuit, Case #2021-2282, Document 17, Appellant Scepter Canada, Inc.'s Principal Brief, filed Jan. 7, 2022, 107 pages.
IPR2020-360, Exhibit 2016, Memorandum and Order, filed Jun. 23, 2021, 18 pages.
IPR2020-00360, Paper 27, Judgment Final Written Decision Determining No Challenged Claims Unpatentable, filed Jul. 2, 2021, 27 pages.
IPR2020-00360, Exhibit 1032, Transcript of Richard J. Roby, Ph.D., conducted Dec. 7, 2020, 138 pages.
IPR2020-360, Exhibit 1033, ASTM Standard Specification for Flame Mitigation Devices on Portable Fuel Containers, 2020, 8 pages.
IPR2020-00360, Exhibit 1034, Health and Safety Executive, Flame Arresters and Explosion Reliefs, 1980, 48 pages.
IPR2020-00360, Paper 28, Record of Oral Hearing Held on Apr. 8, 2021, 78 pages.
IPR2020-00360, Paper 30, Petitioner's Notice of Appeal, filed Sep. 2, 2021, 33 pages.
IPR2020-00360, Exhibit 1031, Video-Recorded Deposition of Richard J. Roby, PE, Ph.D., conducted Nov. 23, 2020, 121 pages.
IPR2020-00360, Paper 11, Patent Owner's Response, filed Sep. 30, 2020, 74 pages.
IPR2020-00360, Exhibit 2009, Obayes et al., "Experimental Investigation of Flame Speed of Gasoline Fuel-Air Mixture," International Journal of Current Engineering and Technology, 2018, vol. 8, No. 2, 6 pages.
IPR2020-00360, Exhibit 2010, Definition of "Sufficient" and "Suppress", New Oxford American Dictionary, 2010, 5 pages.
IPR2020-00360, Exhibit 2011, Zabetakis, Bulletin 627, Bureau of Mines, Flammability Characteristics of Combustible Gases and Vapors, 1965, 4 pages.
IPR2020-00360, Exhibit 2012, Marks' Standard Handbook for Mechanical Engineers, p. 6-11.
IPR2020-00360, Exhibit 2013, MatWeb Material Property Data, Tensile Property Testing of Plastics, 2020, 2 pages.
IPR2020-00360, Exhibit 2003, File History of U.S. Patent No. 9,174,075, 147 pages.
IPR2020-00360, Paper 14, Petitioner's Reply, filed Dec. 23, 2020, 34 pages.
IPR2020-00360, Paper 19, Patent Ower's Sur-Reply, filed Feb. 3, 2021, 32 pages.
IPR2020-00360, Exhibit 1035, Supplemental Declaration of Samim Safaei, 57 pages.
IPR2020-00360, Exhibit 2008, Deposition Transcipt of Samim Safaei, dated Sep. 25, 2020, 52 pages.
IPR2020-00360, Exhibit 2014, Declaration of Richard J. Roby, P.E., Ph.D., 126 pages.
IPR2020-00360, Exhibit 2015, Zoom Deposition Transcript of Samim Safaei, P.E., taken Jan. 28, 2021, 72 pages.
Case 2:18-cv-02681-HLT-KGG, Document 257, Memorandum and Order, dated Jun. 23, 2021, 18 pages.
Briggs & Stratton Strainer-Fuel Part No. 710065, Briggs & Stratton Genuine Parts Catalog, 2006, 114 pages.
Centurion Strainer Part No. OH1326, Generac Parts Manual GP6500kW 389cc (Model 0059402), May 21, 2014, 4 pages.
Weyandt, N., et al., "Flame Arrester Evaluation for E-Diesel Fuel Tanks," Subcontractor Report, National Renewable Energy Laboratory, Sep. 3, 2002-May 28, 2003, 27 pages.
IPR2020-00361, Petition for Inter Partes Review of U.S. Pat. No. 9,174,075, dated Dec. 27, 2019, 109 pages.
Case No. 2:18-cv-02681-HLT, Document 711, Verdict Form filed Mar. 14, 2023.

* cited by examiner

FLASH SUPPRESSOR FOR INHIBITING EXPLOSIONS

CROSS-REFERENCE TO RELATED APPLICATIONS

This application is a continuation of U.S. application Ser. No. 16/042,816, filed Jul. 23, 2018, which is a continuation of U.S. application Ser. No. 14/927,133, filed Oct. 29, 2015, now U.S. Pat. No. 10,029,132, which is a continuation of U.S. application Ser. No. 14/487,893, filed Sep. 16, 2014, now U.S. Pat. No. 9,174,075, which is a continuation-in-part of U.S. application Ser. No. 13/904,657, filed May 29, 2013, now abandoned, which claims the benefit of U.S. Provisional Application Nos. 61/653,240, filed May 30, 2012 and 61/754,266, filed Jan. 18, 2013. The entire disclosures of these applications are incorporated by reference herein in their entirety.

BACKGROUND OF THE INVENTION

1. Field of the Invention

The present invention concerns a portable container intended for holding and dispensing flammable fuels. More particularly, it is concerned with an improved fuel container design which seeks to inhibit even the possibility of explosions by intentionally retaining a quantity of fuel proximate to an opening in order to provide a fuel-air mixture within the container that is too rich to support combustion.

2. Description of the Prior Art

Portable fuel containers as used herein are intended to refer to containers which hold about 6 gallons (about 26.43 liters) or less of fuel. Such portable fuel containers have traditionally been constructed of metal or synthetic resin and configured to permit stored fuel to be dispensed from an opening for use. Existing portable fuel containers are safe and effective for their intended purpose when properly used. Unfortunately, notwithstanding warning labels, common sense and safety instruction, as well as the experiences of others, users are known to have improperly used fuel containers. Bad judgment or practically no judgment is occasionally exercised by those users who ignore safe practices and instead recklessly pour liquid fuel from a portable container into a smoldering campfire or brush pile, or even onto an open flame. The resulting consequences are predictable but tragic when the fuel which is being poured and the fuel vapors ignite and burns the user and others in the vicinity of the fuel container.

Most children are taught at a young age that fire or explosion may result from a combination of fuel (e.g., gasoline or other inflammable liquids), oxygen (such as is present in the atmosphere) and a source of ignition. Most safety measures concentrate on eliminating one of these elements. Thus, modern EPA approved portable fuel containers include warnings and provide closures that enclose the fuel container to shut off the source of fuel. These fuel containers work well under normal circumstances where the user exercises even a minimum of care. It is believed that even under conditions of abuse as described herein, fuel containers of recent manufacture will not explode. However, explosions within fuel containers have been induced by researchers in highly-controlled, extreme laboratory environments. While it is believed that it is only possible to produce an explosion within a fuel container under such extreme laboratory conditions, there has developed a need for a new approach to inhibiting combustion within portable fuel containers.

Attempts have been made to eliminate the possibility of portable fuel container explosions. Some portable fuel containers made of metal (specifically safety cans) employ a metal flame arrestor. A flame arrestor is a metal screen that is fitted inside the neck of the tank and attempts to keep an ignition source such as a flame or spark from entering the tank of the portable fuel container. While such flame arrestors may be beneficial in a safety can, there are difficulties using them in common plastic fuel containers. For example, while filling a portable fuel container at a gas station, pumping gasoline through a flame arrestor screen could cause the fuel to splash back out of the container and mix with air, thereby creating a mixture ready for combustion. Moreover, pumping gasoline through a metal screen may cause a static spark with obvious catastrophic consequences. Metal safety cans offer a grounding tab to prevent this static electricity discharge, but this is not possible nor practical in a synthetic resin (plastic) tank as ordinary consumers are not familiar with this apparatus or practice. Furthermore, the presence of a metal flame arrestor may give the user a false sense of security or safety to the consumer and user and, if positioned just inside the neck of the container (as they are in such metal safety cans) they can be easily removed, thus defeating the intent of protecting against even irresponsible use.

Thus, while the use of existing flame arrestors may have benefits, its limitations, especially in the context of use in a synthetic resin portable fuel container, still presents problems and far outweigh any benefits. A flame arrestor's intent is to keep the flame or spark from entering a portable fuel container, but this may not prove sufficient to defeat combustion when a user removes the flame arrestor or pours fuel directly onto fire.

SUMMARY OF THE INVENTION

The present invention seeks to accomplish these goals by employing a method and apparatus which run contrary to conventional thinking, in that rather than cutting off a source of liquid fuel or ignition sources, an overly rich fuel-to-air ratio is provided within the portable fuel container, thus preventing the possibility of combustion.

As noted above, it is accepted scientific fact that when fuel and air are present and their mixture is within a given combustible range, combustion will occur if the mixture is ignited. If the mixture of fuel and air is perfect (a stoichiometric mixture), complete combustion is achieved and both the fuel and the air are totally consumed during the combustion event. Combustion may also occur if the mixture is slightly lean of fuel, but if too lean (i.e., not enough fuel is present) combustion cannot occur. Similarly, combustion may occur if the mixture has slightly more fuel than a stoichiometric mix, but if the fuel-air mixture has too much fuel (becoming too rich), combustion cannot occur in this condition either.

The present invention seeks to employ this latter circumstance—a situation where the fuel-air mixture is too rich—to inhibit combustion within the portable fuel container where, for example, fuel is being poured directly from the container opening onto an ignition source or within a controlled laboratory where fuel is "weathered" and maintained at an artificial temperature to establish a condition ripe for explosion. Again, the former circumstance is a highly undesirable practice which poses extreme risks to the user and others and should be avoided at all times, and the latter occurs only artificially when one intends to produce combustion within a container. The present invention seeks to minimize the risk of combustion in the portable fuel container even where the user proceeds recklessly or explosion is an intended consequence.

The method and apparatus of the present invention employs structure which will be unlikely to be removed by an imprudent user because it does not impede normal usage, yet retains a sufficient quantity of fuel within the portable fuel container so as to create a mixture too rich to combust. Where there is sufficient fuel present in the container to present a risk of explosion when the contents are being poured, the present invention uses this condition to its advantage by trapping a sufficient quantity of fuel and thereby creates a "too rich" condition to inhibit combustion within the container. In some preferred embodiments, the structure of the apparatus and the method seek to cause this condition to be maintained in close proximity to the opening such that combustion may not proceed into the interior of the container but rather any explosive event will be suppressed by the retention of fuel immediately proximate the opening. In this circumstance, an incipient explosion entering the portable fuel container will encounter a circumstance where the amount of fuel in the fuel-air mixture will not support combustion.

The present invention contemplates several alternate structures for providing this condition. In one approach, a neck dam is positioned in a neck of the portable container interior to the opening whereby a sufficient quantity of fuel is trapped in the neck area during pouring of fuel from the opening. In another approach, an absorbent, sponge-like material is utilized within the interior of the container either within a main body or in the neck proximate to an opening in the container. The absorbent material, by becoming substantially saturated and retaining a quantity of fuel in the area of the neck once fuel is poured therefrom, provides a "too rich" mixture for combustion and the onset of an explosion. In another approach, the container is configured to provide an inverted pocket for retaining fuel adjacent the neck area, the pocket retaining sufficient fuel during pouring from the container to provide a fuel-air mixture too rich to support combustion. A further approach is to provide a flash suppressor which is integral to the neck or tank walls and extends into the fuel-receiving chamber of the container, which accommodates the introduction of fuel into the container from a conventional gasoline pump nozzle, includes a substantially imperforate fuel-retaining wall to create a fuel-retaining pocket adjacent the opening in the container which fuel-retaining wall extends part way into the fuel-receiving chamber, and includes perforations to permit fuel to flow therethrough for filling the container and dispensing fuel therefrom. Each of these alternative structures is employed to retain a sufficient quantity of fuel within the container, and in particular in the narrowed neck area such that the fuel-air mixture is too rich to support combustion entering and/or occurring into the interior of the tank portion of the portable fuel tank—even combustion which may be occurring in the environment just exterior to the opening.

DETAILED DESCRIPTION OF EXEMPLARY EMBODIMENTS

Like reference numbers are used to identify the same or similar structures in the different embodiments and views.

Figure 1:
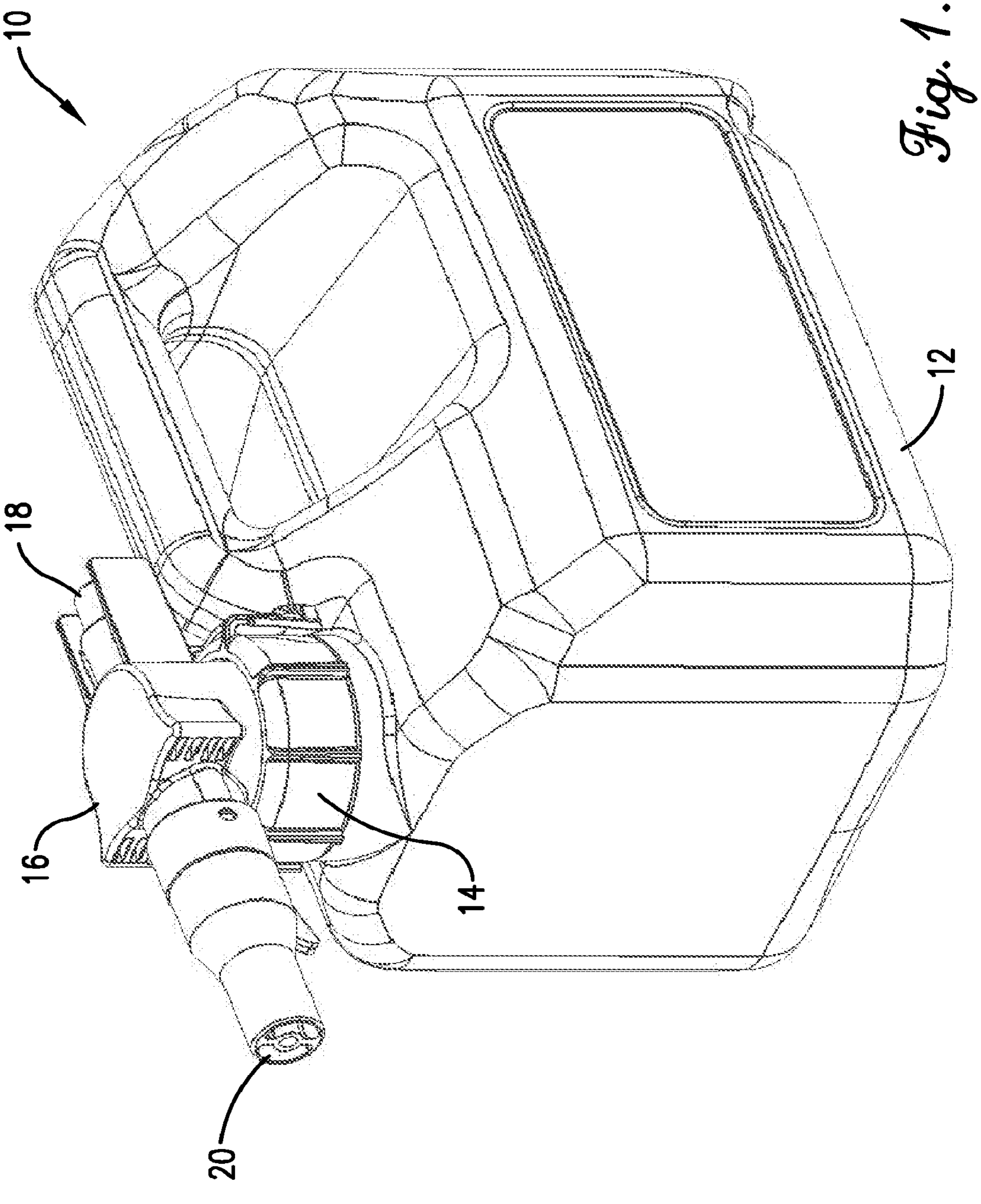
FIG. 1 is a perspective view of a portable fuel container having a hollow tank body, and a fuel dispensing nozzle mounted to a neck.

Referring now to the drawings, FIG. 1 shows a portable fuel container 10. The fuel container 10 is shown as an example of the variety of different fuel containers with which the present invention may be employed, it being understood that the present invention is not limited to the particular fuel container 10 as shown herein. The fuel container 10 includes a hollow tank body 12, a collar 14 which is removably mounted to the fuel container 10 and which, in combination with a dispensing spout 16, covers an opening which may be used for filling the fuel container 10 with fuel and from which the fuel contained therein may be selectively dispensed. The dispensing spout 16 of this example is a selectively actuatable dispensing spout biased to a non-dispensing condition, such that the user must operatively depress a button 18 in order to enable fuel to flow from the tank body 12 through the dispensing spout 16 and from a discharge outlet 20. The dispensing spout 16 may be held by the collar 14 which is threadably attached to a neck 22 fluidically communicating with the tank body 12, the external threading on the neck 22 being shown in FIG. 2. In the example shown in FIG. 1, both the dispensing spout 16 and the collar 14 are coupled together whereby unscrewing the collar 14 causes the collar 14 and dispensing spout 16 to be detached from the container as a unit. When the dispensing spout 16 or collar 14 are removed, an opening 24 is revealed which permits filling of the tank body 12 with fuel or, in typically undesired circumstances, through which fuel contained in the tank body 12 may be poured. The size of the opening 24 can be at least at least 2.0, 2.25, 2.75, or 3.0 square inches and/or not more than 10, 8, 6, or 4 square inches. As shown in FIGS. 2-6 and 12-15, a fuel-receiving chamber 25 is presented within the body 12. The fuel-receiving chamber 25 can have a capacity of at least 1 gallon and/or not more than 6 gallons. The fuel container body 12, collar 14 and spout 16 are preferably molded of synthetic resin, such as, for example, polyethylene.

Figure 2:
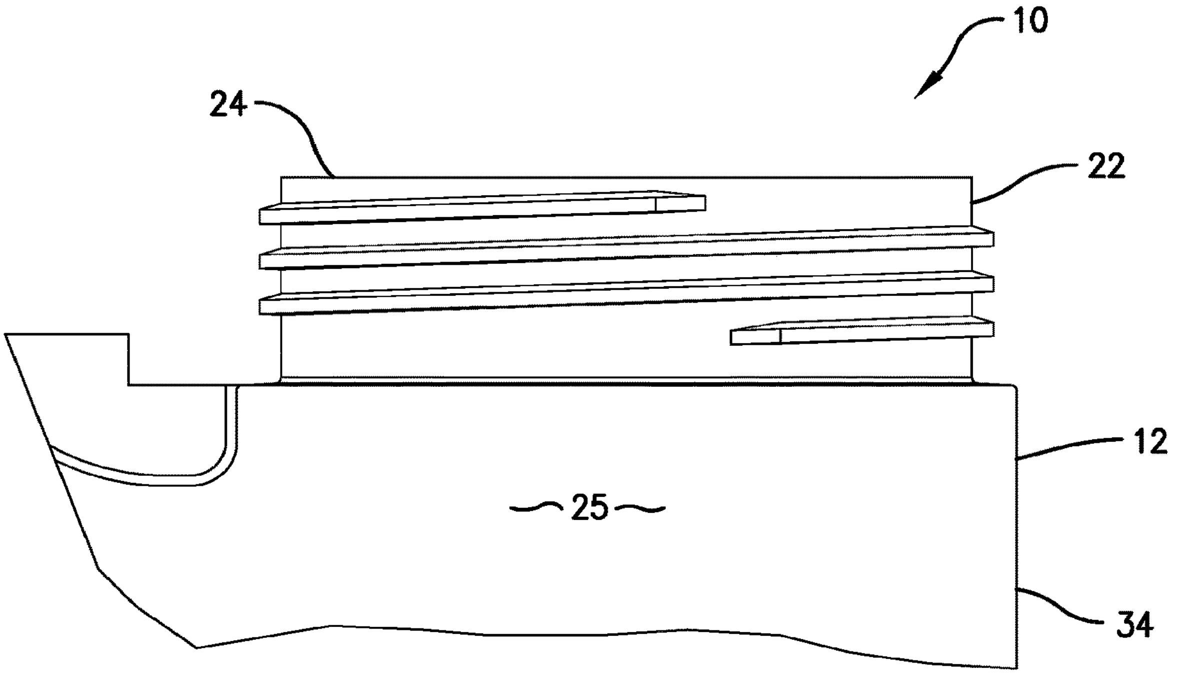
FIG. 2 is an enlarged side elevational view of a neck and opening of a portable fuel container according to the prior art, showing in vertical cross-section a part of the tank body adjacent the neck.
Figure 3:
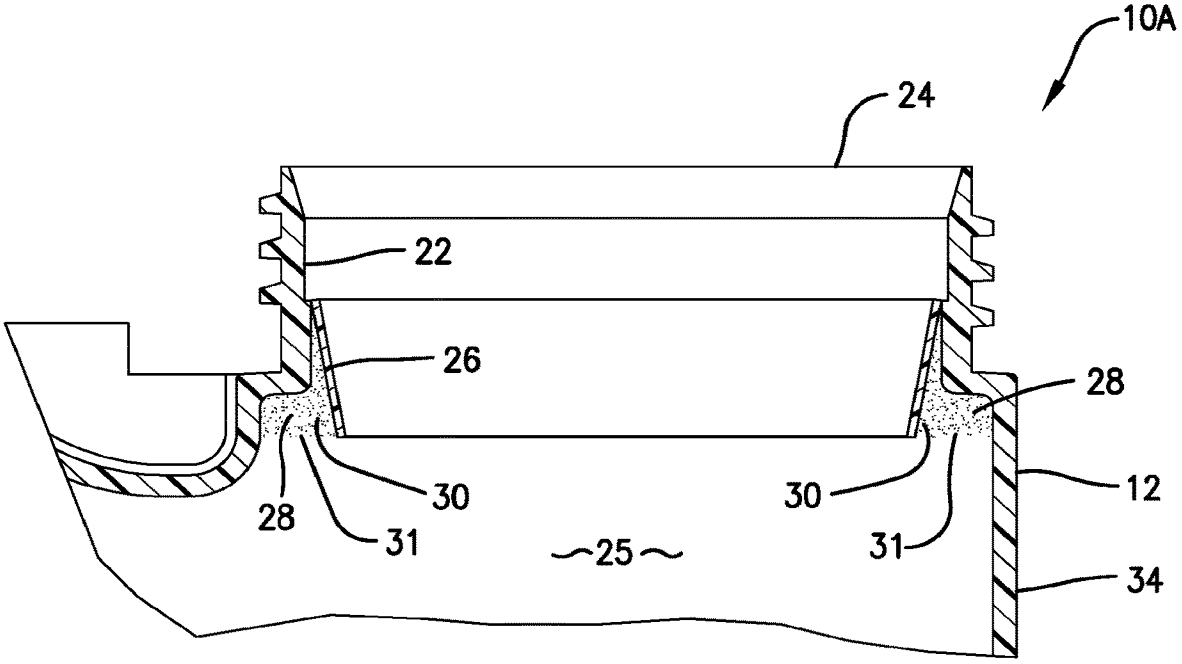
FIG. 3 is an enlarged side elevational view of a neck and opening of a portable fuel container according to one embodiment of the present invention, utilizing an annular neck dam which is inwardly flared to retain fuel proximate the neck and opening.

A typical neck 22 of a portable fuel container 10 is shown in FIG. 2. FIG. 3 illustrates a first embodiment of the apparatus of the present invention. A portable fuel container 10A may be constructed substantially identically to that shown in FIGS. 1 and 2. However, an annular neck dam 26 of synthetic resin material such as polyethylene or polypropylene which is resistant to degradation by exposure to fuel such as gasoline is inserted into the neck 22 proximate the opening 24. As shown in FIG. 3, the annular neck dam 26 may extend around the interior surface of the neck 22 and extends downwardly toward and into the tank body 12. The annular neck dam 26 may be flexible, and flared radially inwardly. Thus, when the portable fuel container 10A is tipped or inverted, fuel 28 (shown by stippling) is retained in a reservoir 30 created by the neck dam 26 adjacent the opening 24 thereby increasing the fuel-air mixture in the vicinity of the neck 22. A generally downwardly facing reservoir opening 31 allows the fuel 28 to enter the reservoir 30 when the fuel container 10A is tipped or inverted and also allows the fuel 28 retained in the reservoir 30 during dispensing to flow back out of the reservoir 30 when the container 10A is returned to its upright position. In certain embodiments of the invention, the reservoir 30 is sized to retain at least 6 milliliters of liquid fuel per gallon of liquid capacity of the container 10. In other embodiments, the reservoir 30 is sized to retain at least 10 milliliters of liquid fuel per gallon of liquid capacity of the container 10.

Figure 4:
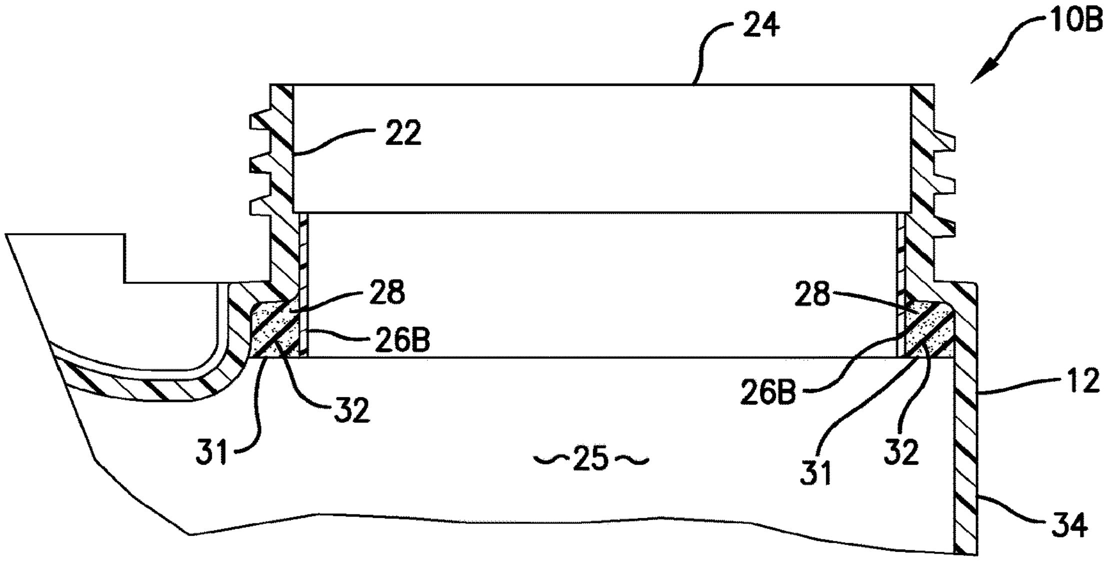
FIG. 4 is an enlarged side elevational view of neck and opening of a portable fuel container according to another embodiment of the present invention, utilizing an annual neck dam which has a circumscribing and downwardly extending without flaring, and which retains an absorbent sponge-like material.

FIG. 4 shows an alternate embodiment of the portable fuel container 10B hereof, the portable fuel container 10B being constructed substantially the same as that shown in FIGS. 1, 2 and 3. However in FIG. 4, the annular neck dam 26B is not flared, but rather is substantially configured as a cylindrical tube fitted into the neck 22 and extending downwardly toward and into the tank body 12. An optional pad 32 of porous compressible absorbent material which is sponge-like is provided in the reservoir 30. The annular neck dam 26B may thus serve to retain the pad 32 which as shown may also be annular. Alternatively, the annular neck dam 26B may be omitted, with the pad 32 retained in position by adhesive or mechanical attachment. Fuel 28 may be retained in the reservoir 30 when the portable fuel container 10B is tipped or inverted, thereby increasing the ratio of fuel to air in the vicinity of the neck 22 and opening 24.

Figure 5:
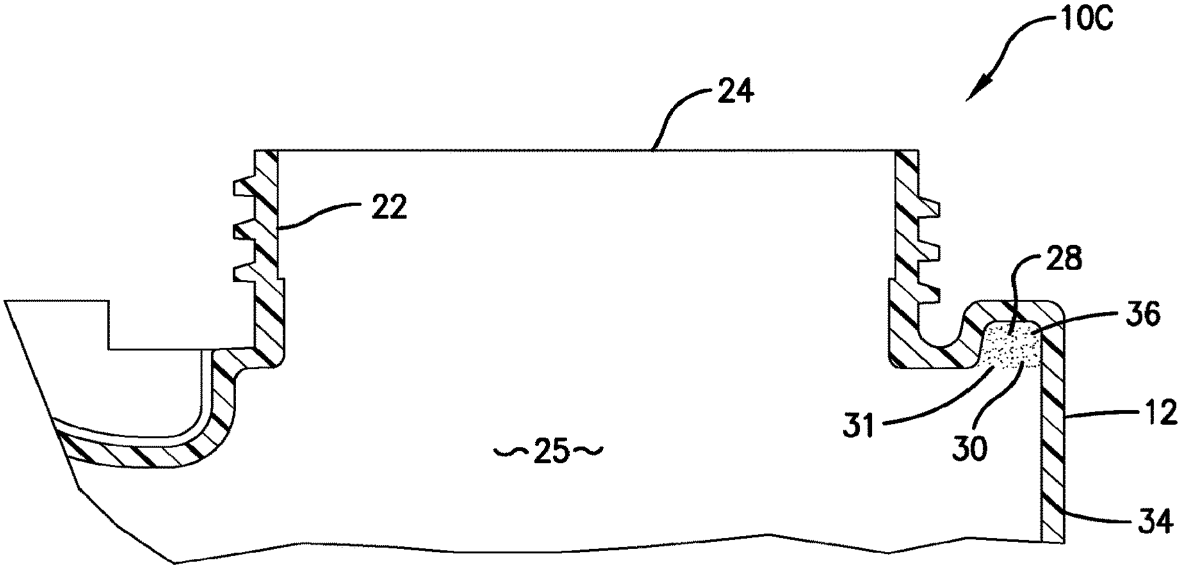
FIG. 5 is an enlarged side elevational view of a neck and opening of a portable fuel container according to a further embodiment of the present invention, which utilizes and inverted fuel-retaining pocket adjacent the neck and opening.

FIG. 5 shows a further alternate embodiment of the portable fuel container 10C hereof. While substantially identical to the portable fuel containers shown in FIGS. 1-4, the wall 34 of the tank body 12C adjacent the neck 22 is configured with an inverted pocket 36. The pocket 36 may be constructed so that it extends completely around and thus surrounds the neck 22, or alternatively as shown in FIG. 5, may be located and configured so that it extends less than 360° around the base 38 of the neck 22. When the portable fuel container 10C is tipped or inverted, fuel 28 will be held in the pocket 36, thereby increasing the ratio of fuel to air in the vicinity of the neck 22.

Figure 6:
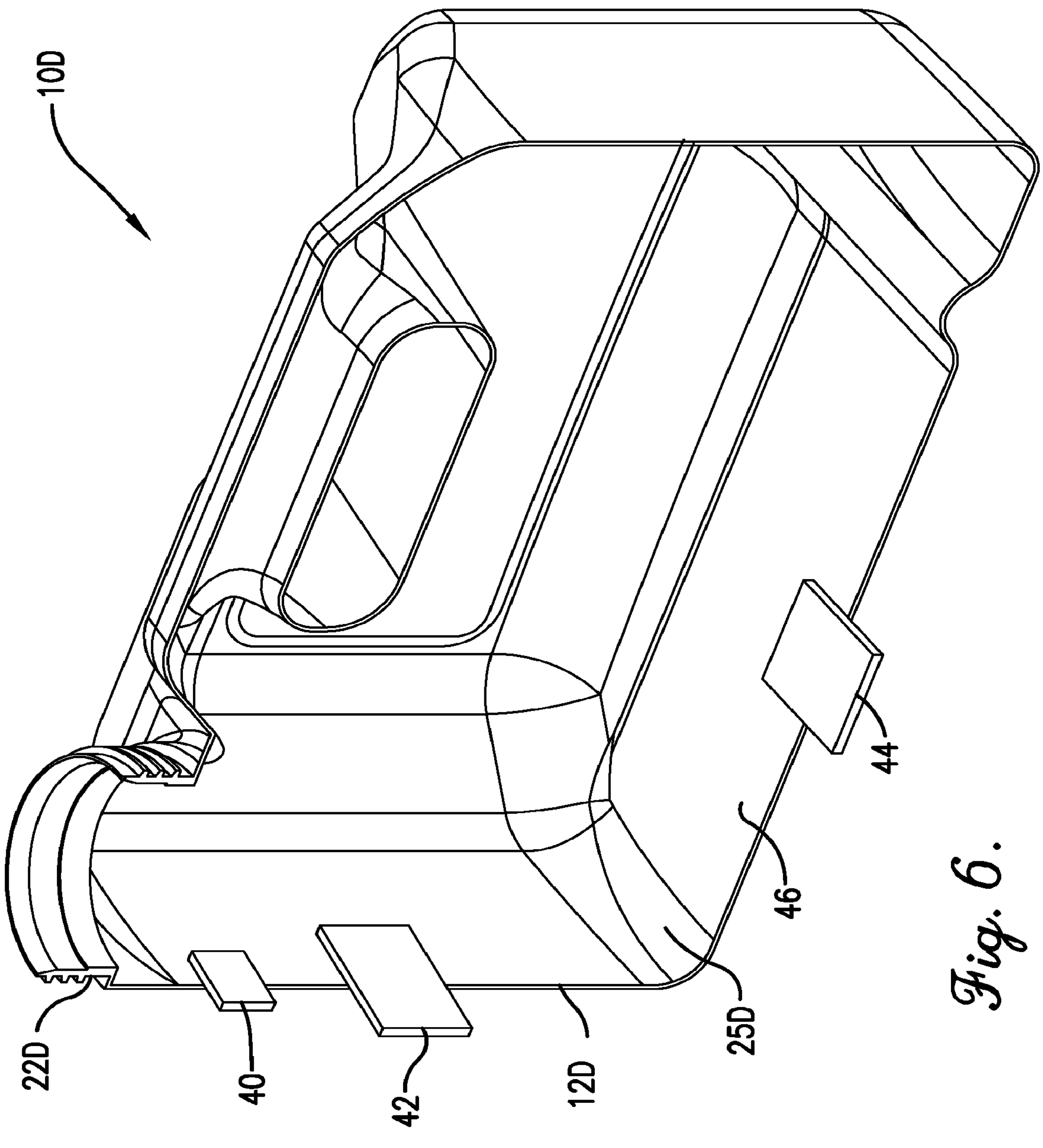
FIG. 6 is an isometric view of a vertical section through a portable fuel container as shown in FIG. 1 with the fuel dispensing nozzle removed and showing a plurality of absorbent pads mounted interiorly of the main body for absorbing and retaining fuel within the portable fuel container.
Figure 7:
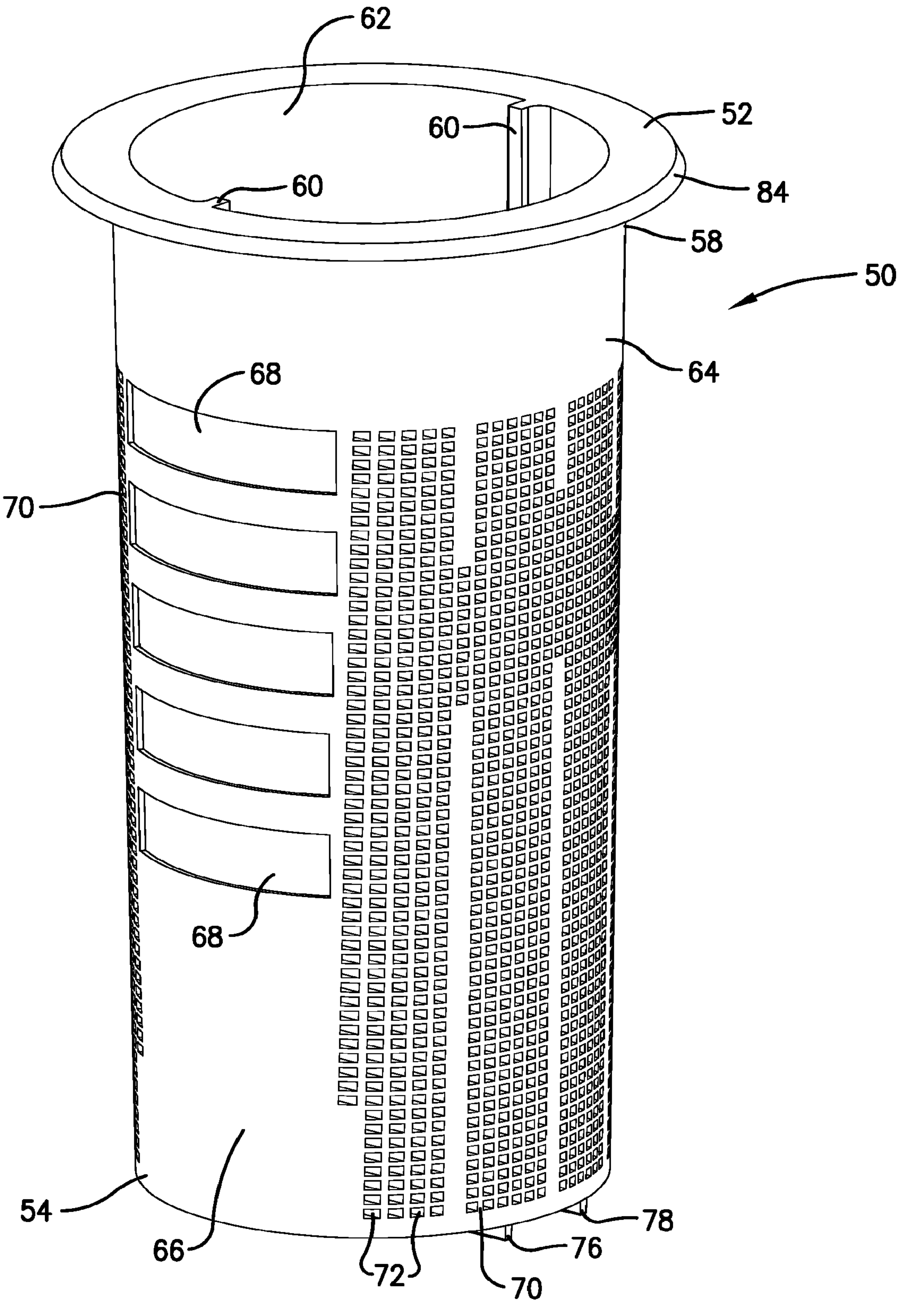
FIG. 7 is an isometric view of a flash suppressor for integrating inside the neck of a portable fuel container and having a fuel-retaining wall for creating a fuel-retaining pocket proximate the neck and opening of a fuel container.

FIG. 6 shows a yet further alternate embodiment of the fuel container 10D hereof. FIG. 6 shows the tank body 12D and neck 22D in cross-section, with the opening enclosed but with the understanding that in practice the neck 22D would be open so that fuel could flow into the chamber 25D through an opening in the neck 22D. It is to be understood that the neck 22D would be externally threaded to receive the dispenser 16 shown in FIG. 1, and could have the neck dam or inverted pocket as illustrated in FIGS. 2-5. FIG. 6, however, also shows the use of absorbent pads 40, 42 and 44 attached to the inside surface 46 of the tank body 12D. It is contemplated that only one such absorbent pad would be used per fuel container, but it is possible that a plurality of such pads 40, 42 and 44 could be used simultaneously. While the absorbent pads could be movable or even loose within chamber 25D and still retain sufficient fuel to inhibit an explosion event within the portable fuel container 10D, it is believed that better operating characteristics such as avoiding potential blockages at the opening will be achieved by mounting the pads 40, 42 and 44 to the inside surface 46 using mechanical fasteners or adhesive or bonding the pads to the inside surface 46 of the portable fuel container 10D. Like pad 32, the pads 40, 42 and 44 are preferably porous compressible absorbent material which is sponge-like, for example synthetic resin open-celled foam material. Fuel 28 is thus retained by the pads 40, 42 and 44 to create a mixture too rich for combustion and explosion.

FIGS. 7 through 15 show a flash suppressor 50 that can be integrated into a portable fuel container 10E. The flash suppressor 50 may have an annular rim 52, a generally cylindrical, conical, or frustoconical suppressor sidewall 54, and a bottom wall 56. The flash suppressor 50 can be injection molded from a synthetic resin material such as polyethylene to be compatible with the tank body. The suppressor sidewall 54 may slightly taper inwardly from its width at the rim 52 to the bottom wall 56 to facilitate molding, for example from between about 0.5° to about 2.5° and most preferably about 1° of taper. The annular rim 52 surrounds an open area into which a gas nozzle may be inserted and may project outwardly from an upper end 58 of the suppressor sidewall 54 a sufficient distance to engage an inner surface of the neck of the portable fuel container into which it is received. The suppressor sidewall 54 may be provided with axially extending ribs 60 along an interior surface 62 of the suppressor sidewall 54. These ribs 60 may extend substantially from the annular rim 52 to the bottom wall 56 to resist wear from the insertion of gasoline nozzles therein or deformation.

As shown in FIGS. 7, 10-15, the suppressor sidewall 54 can include a circumferentially extending imperforate fuel-retaining wall 64 that retains some of the fuel held in the chamber 25 when the portable fuel container is tipped or inverted to position the opening 24 below the level of fuel held within the chamber 25. The fuel-retaining wall 64 can extend axially downwardly from the upper end 58 of the sidewall 54. In certain embodiments, the fuel-retaining wall 64 extends completely around the circumference of the sidewall and is continuous with the annular rim 52 so that fuel cannot pass between the fuel-retaining wall 64 and the rim 52. The fuel-retaining wall 64 extends axially a sufficient distance to retain a quantity of fuel sufficient to make the fuel-air mixture adjacent the neck too rich for ignition, depending on the capacity of the container. By way of example, the imperforate fuel-retaining wall 64 may extend axially downward from the rim 52 at least about 0.25 inch, at least about 0.5 inch, or at least about 1 inch. The suppressor sidewall 54 may also include a pair of circumferentially spaced axially extending imperforate sections 66 having radially offset (relative to the remainder of the imperforate section) axially spaced circumferentially oriented bands 68 to provide rigidity, and a pair of circumferentially spaced axially extending perforate sections 70 which include an array of perforations 72 sized to permit the flow of fuel, such as liquid gasoline, and air therethrough.

The suppressor sidewall 54 preferably extends downwardly to position the bottom wall 56 a sufficient distance to permit insertion of a gasoline pump nozzle past the neck 22 and into the area interior of the suppressor sidewall 54. In certain embodiments, the flash suppressor 50 extends at least 0.5, 1, 2, or 3 inches and/or not more than 12, 8, or 6 inches downwardly into the liquid-receiving chamber 25. Further, the flash suppressor 50 can have an internal volume (e.g., the volume of the space defined between the sidewall 54 and above the bottom wall 56) of at least 0.5, 1, 2, or 3 cubic inches and/or not more than 20, 15, 10, or 5 cubic inches.

Figure 8:
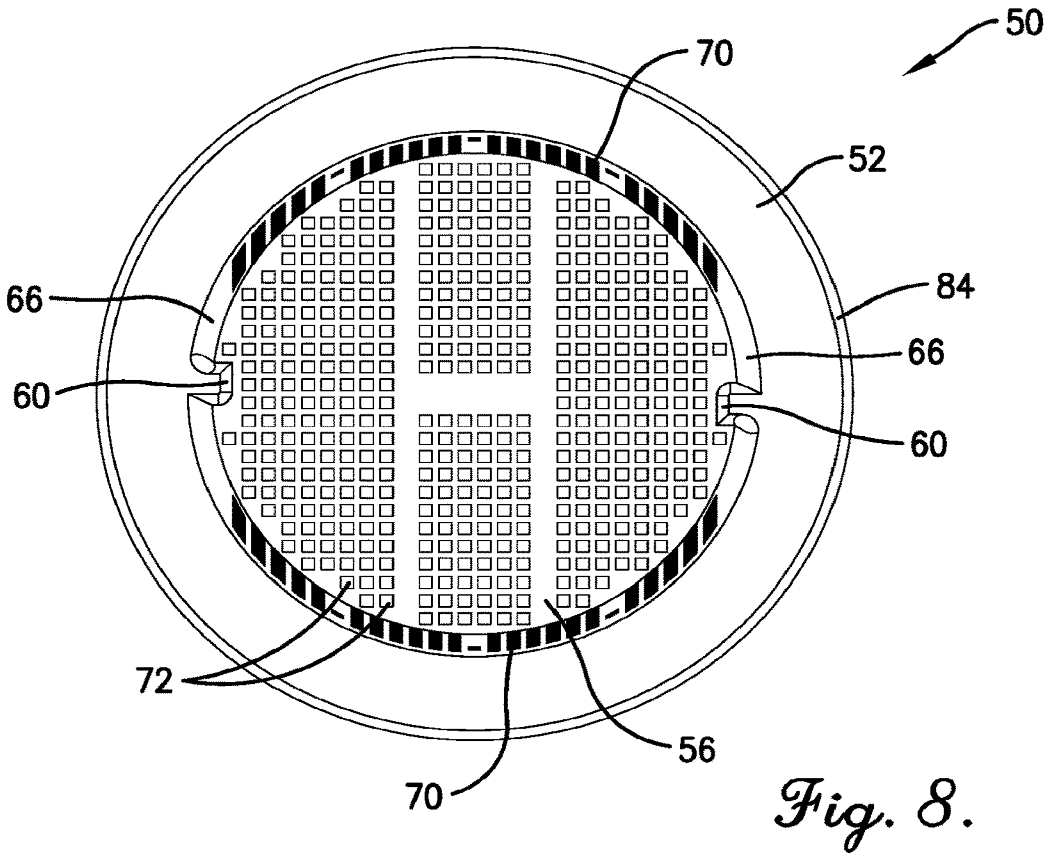
FIG. 8 is a plan view of the flash suppressor of FIG. 7 showing an annular rim configured for engaging the inner surface of the neck of the fuel container.
Figure 9:
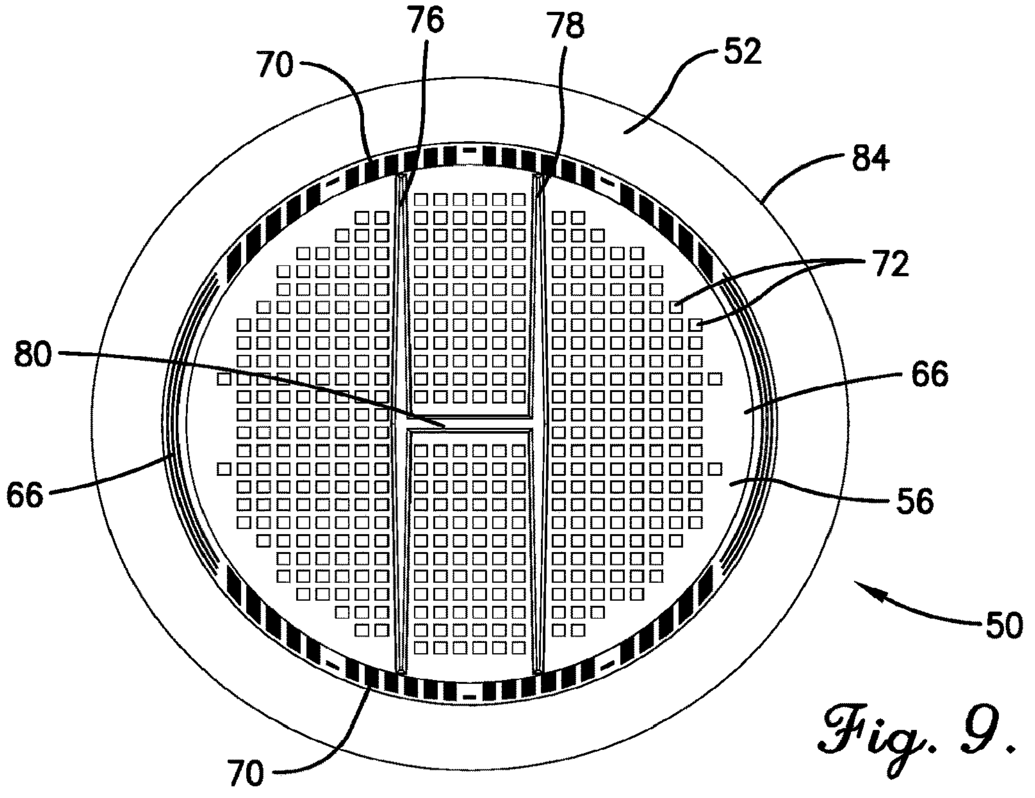
FIG. 9 is a bottom view of the flash suppressor of FIG. 7 showing perforations in the bottom wall of the flash suppressor for permitting fuel to pass therethrough.
Figure 10:
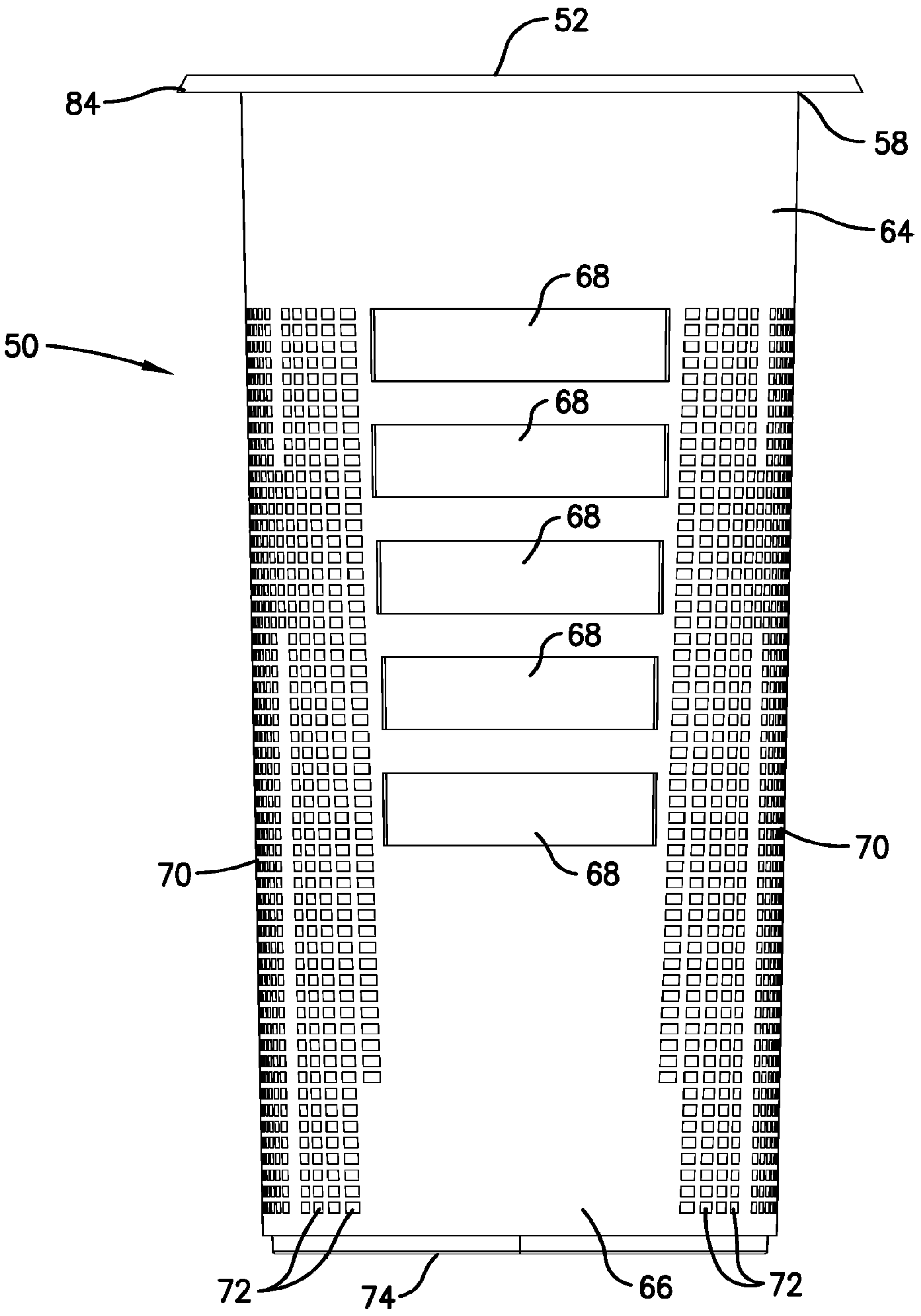
FIG. 10 is a front elevation view of the flash suppressor of FIG. 7 showing the annular rim in profile and the fuel-retaining wall adjacent the rim, the rear view being a mirror image thereof.
Figure 11:
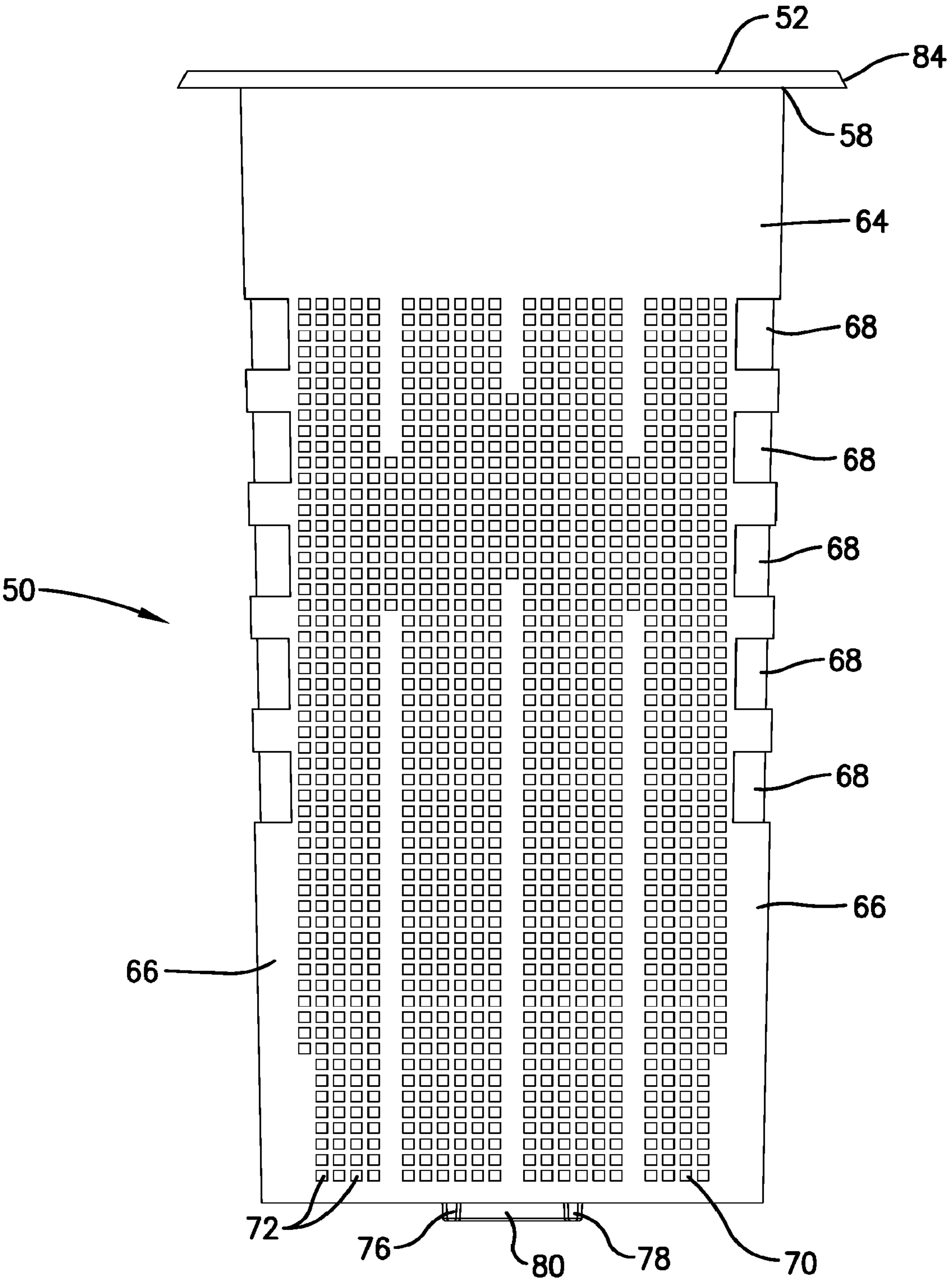
FIG. 11 is right side elevation view of the flash suppressor of FIG. 7 showing perforations in the sidewall of the flash suppressor below the fuel-retaining wall, the left side elevation being a mirror image thereof.

The bottom wall 56 of the flash suppressor 50, seen best in FIGS. 8 and 9, may include transverse reinforcement 74 in a generally H shape including downwardly extending transverse flanges 76 and 78 and connecting flange 80. The bottom wall 56 can include a plurality of perforations 72 which are sized to permit fuel such as liquid gasoline and air to flow therethrough. The number of perforations 72 and their size and positioning in the bottom wall 56 and suppressor sidewall are preferably sufficient to permit normal filling of the container at a moderate rate of flow without buildup and overflow of fuel from the container. For example, in certain embodiments, the size and positioning of the perforations 72 in the flash suppressor 50 permit at least 5, 7.5, or 10 gallons per minute of gasoline to flow therethrough under common gasoline filling conditions (e.g., atmospheric pressure and room temperature). In order to permit proper flow of liquid fuel through the flash suppressor 50, the side and lower members (e.g., sidewall 54 and bottom wall 56) can be at least 5, 10, 15, 20, or 25 percent open and/or not more than 80, 70, 60, or 50 percent open, where "percent open" is the cumulative open area of all the perforations expressed as a percentage of the total internal surface area of the side and lower members of the flash suppressor. Further, each perforation can be sized to present an open area of not more than 0.1, 0.05, 0.025, or 0.015 square inches.

Figure 12:
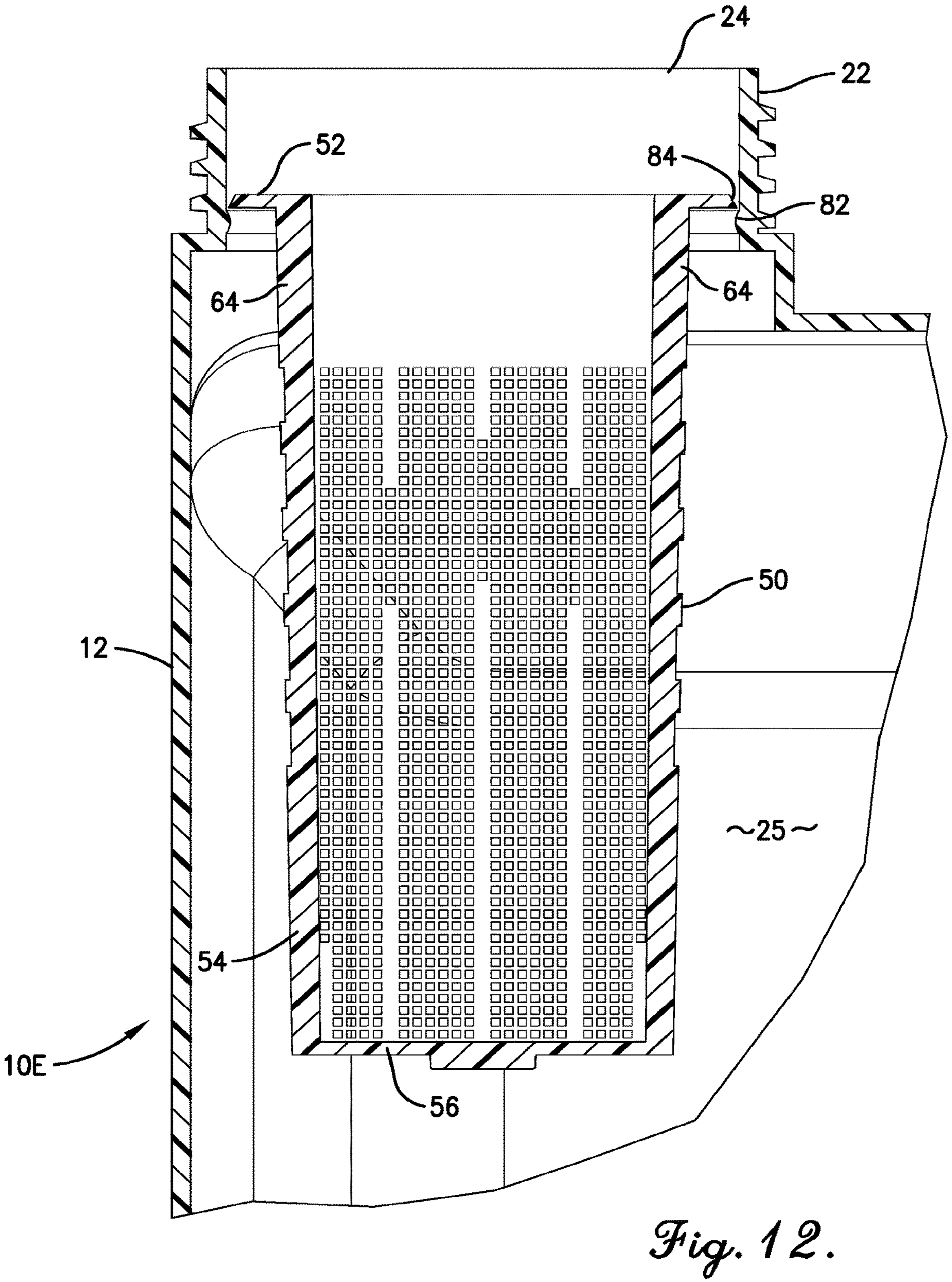
FIG. 12 is an enlarged left side elevation view of the flash suppressor of FIG. 7 placed within the neck of a fuel container prior to integration into the neck.
Figure 13:
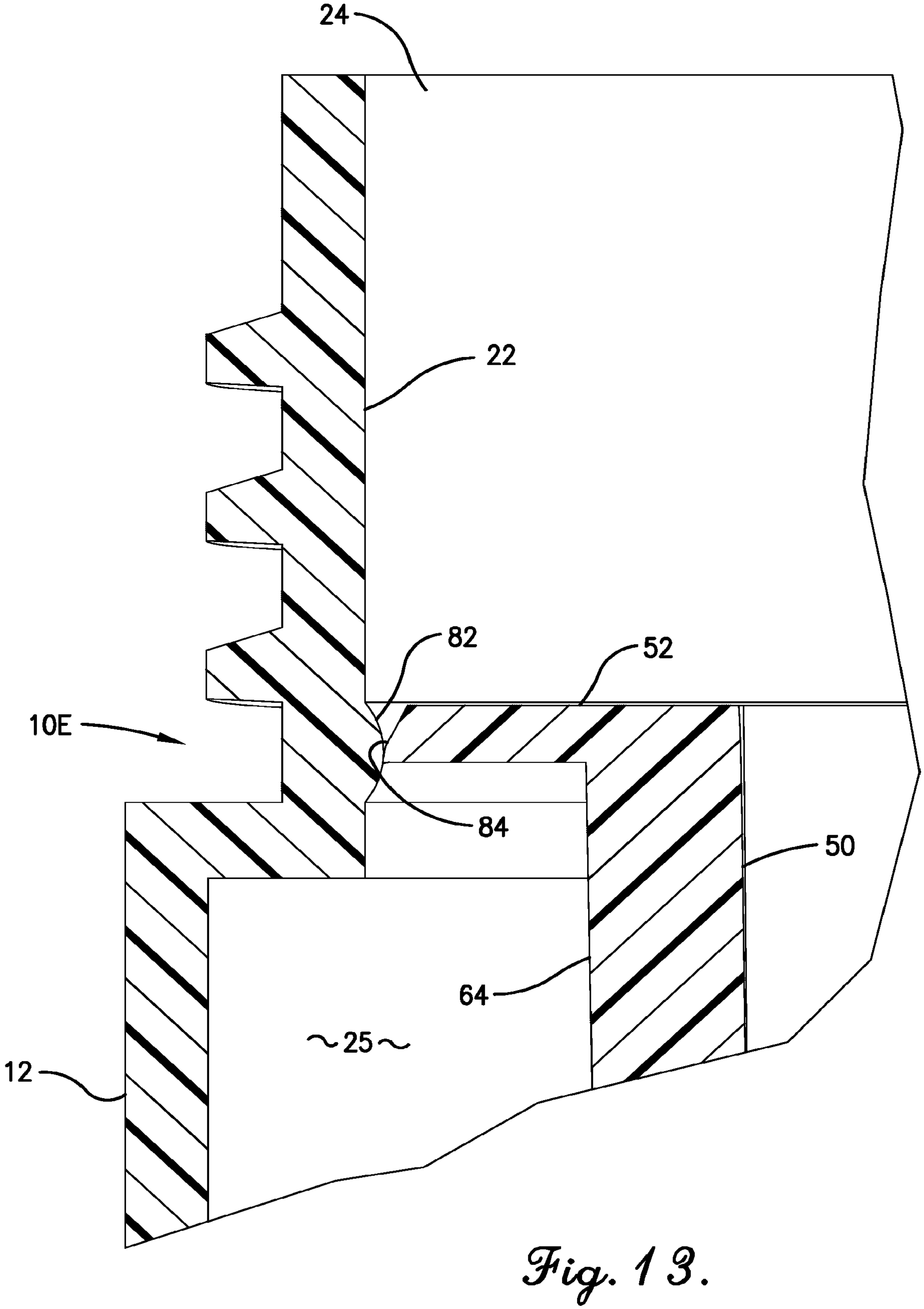
FIG. 13 is an enlarged left side elevation view showing the interference of the annular rim of the flash suppressor of FIG. 7 with a circumscribing bulge located on the inner surface of the neck of the fuel container prior to integration into the neck.
Figure 14:
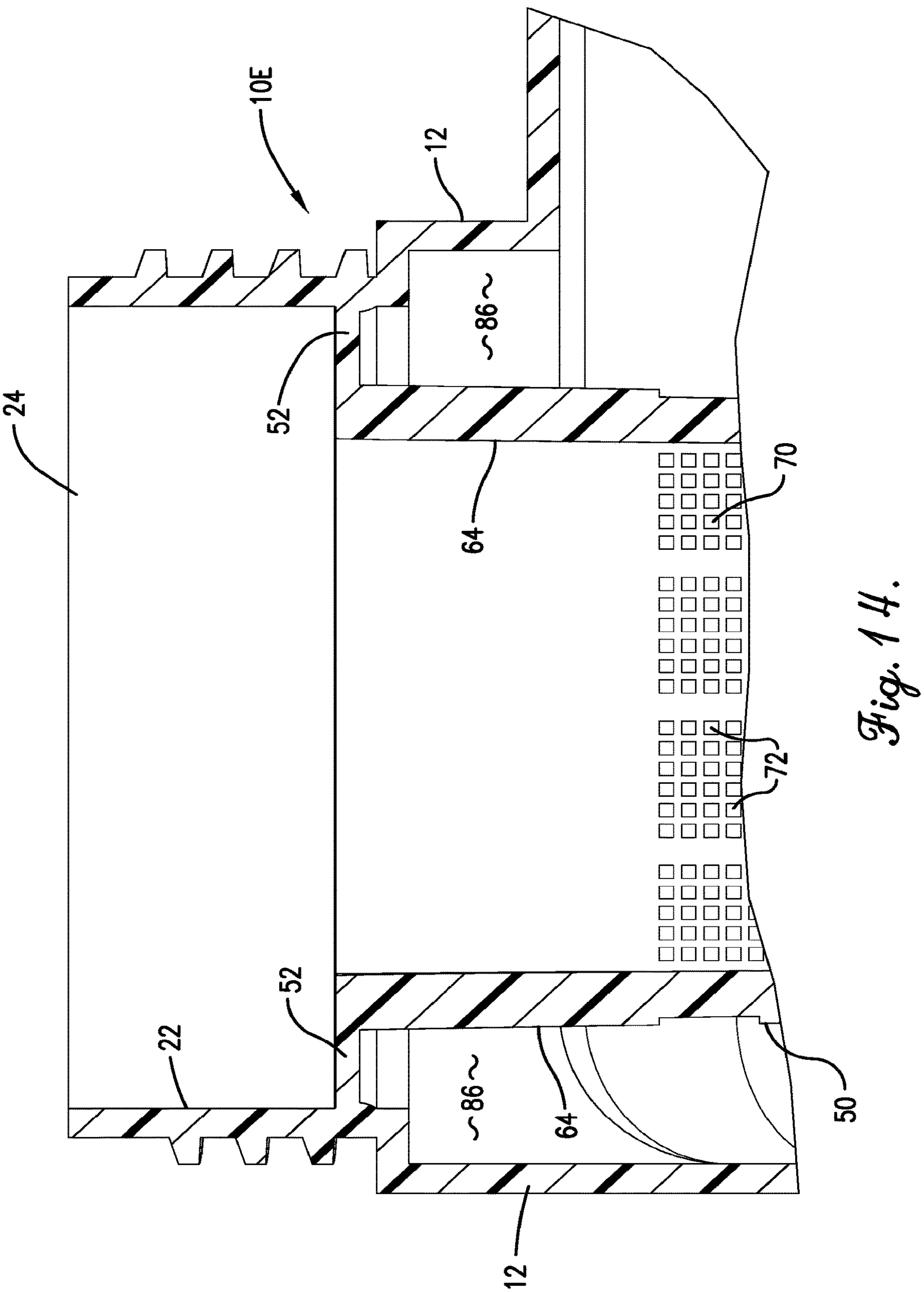
FIG. 14 is an enlarged left side elevation view showing the flash suppressor of FIG. 7 integrated into the neck of the container to provide a fuel-retaining pocket adjacent the neck and opening.
Figure 15:
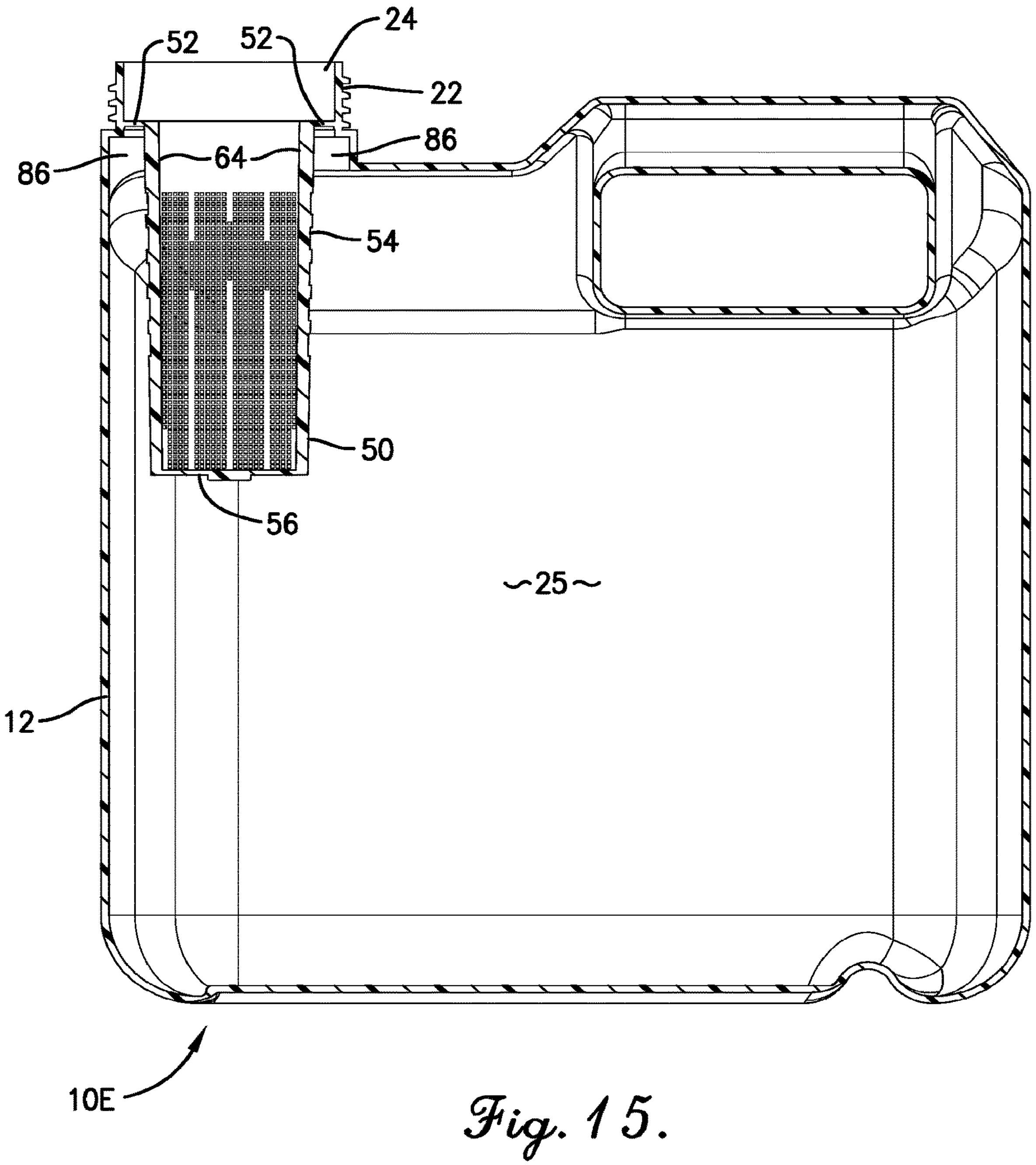
FIG. 15 is a vertical cross-sectional view taken through a fuel container and flash suppressor after integration of the flash suppressor into the fuel container.

In certain embodiments, it may be desired for the flash suppressor 50 be permanently attached (i.e., non-removable) to the body 12 by, for example, bonding or welding. One suitable welding technique is to spin-weld the flash suppressor 50 to the body 12 of the portable fuel container 10E. FIG. 12 shows the flash suppressor 50 inserted into the body 12 where the inner surface of the neck 22 is provided with a radially inwardly projecting circumferentially extending bulge 82, but before integration. In FIG. 13, the flash suppressor 50 is pushed downwardly so that the annular rim 52, which may have a beveled edge 84, is in interference with the bulge 82. The rim 52 thus engages the bulge 82, the sizing being complementary such that the rim 52 is sufficiently resilient and preferably able to deflect upon such engagement. The flash suppressor 50 is then rotated relative to the body sufficiently to melt and weld with the bulge 82 to make the flash suppressor unitary with the body 12, thereby creating a seal preventing air and liquid from moving between the annular rim 52 and the neck 22. This unitization of the flash suppressor 50 with the body 12 creates a reservoir 86 or pocket between the body 12, the rim 52 and the imperforate fuel-retaining wall 64 which retains a quantity of fuel therein when the portable fuel container is tipped or inverted.

Figure 16:
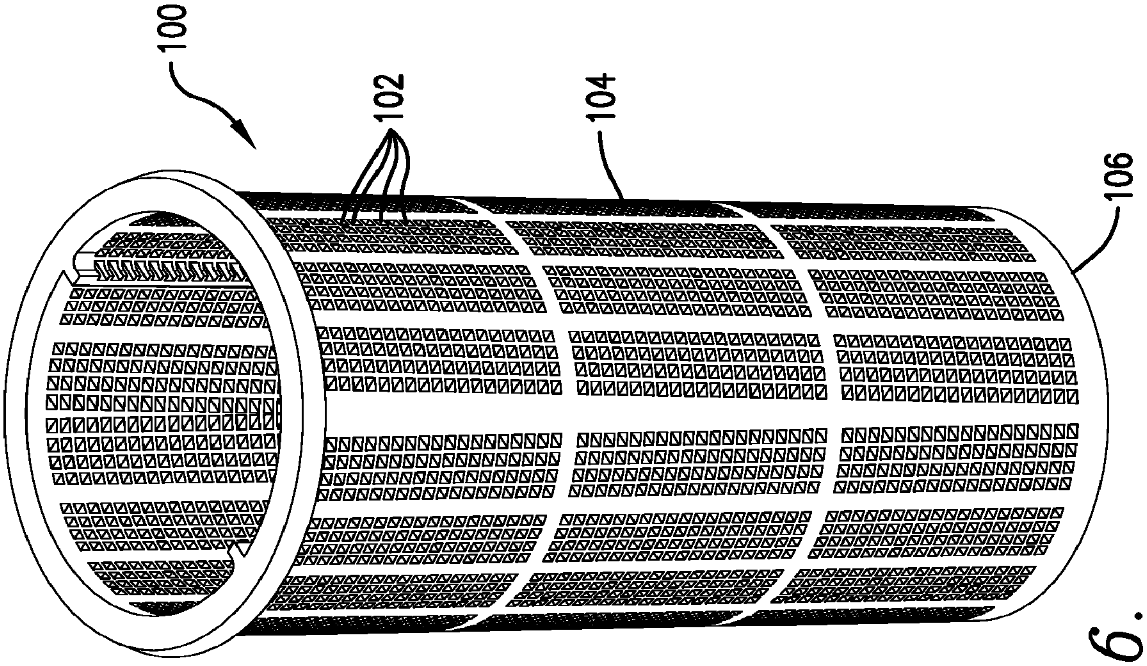
FIG. 16 is an isometric view of a flash suppressor for integrating inside the neck of a portable fuel container having a configuration similar to that of the flash suppressor depicted in FIG. 7, but configured without the fuel-retaining wall, so that fuel retention is accomplished primarily by retaining fuel in the perforations of the flash suppressor.

FIG. 16 depicts an alternative type of fuel retention structure, i.e., a flash suppressor 100, that employs a plurality of perforations 102 to retain a quantity of liquid fuel at or near the opening of the portable fuel container. After liquid fuel is dispensed from the portable fuel container though the perforations 102 and the container is returned to its upright position, the perforations 102 can retain a sufficient quantity of liquid fuel to make the environment inside the flash suppressor 100 too rich in fuel for combustion to occur. Unlike the flash suppressor 50 depicted in FIG. 7, which includes an imperforate fuel retention wall 64 extending around the top of the sidewall 54, the flash suppressor 100 depicted in FIG. 16 relies primarily, and in certain embodiments exclusively, on the perforations 102 for fuel retention. Although other types of fuel retention structures (e.g., absorptive pads, retention walls, etc.) can be incorporated into or used in conjunction with the flash suppressor 100, in certain embodiments, at least 50, 75, 90, 95, or about 100 weight percent of the liquid fuel retained by the flash suppressor 100 is retained within the perforations 102.

The dimensions of the flash suppressor 100 depicted in FIG. 16 are chosen to permit adequate fuel flow through the perforations during filling of the fuel container and adequate retention of fuel in the perforations 102 after dispensing fuel from the fuel container through the perforations 102. In certain embodiments, the perforations are configured in a manner such that after the liquid fuel has been dispensed from the container and the fuel retention structure is no longer submerged in the liquid fuel, a quantity of the liquid fuel is retained in the perforations due to intermolecular forces. The intermolecular forces include forces between molecules within the liquid fuel and forces between molecules of the liquid fuel and molecules of the fuel retention structure.

The perforations 102 of the flash suppressor 100 must provide sufficient open area, as defined previously, to permit fuel to flow adequately through flash suppressor 102 under standard fuel filling conditions without having fuel spill out over the top of the flash suppressor 100. In certain embodiments, the perforations 102 in the sidewall 104 and/or the bottom wall 106 of the flash suppressor 100 can cause the flash suppressor 100 to be at least 5, 10, 15, 20, or 25 percent open and/or not more than 90, 80, 70, 60, or 50 percent open, as defined previously. The total number or perforations in the flash suppressor can be at least 100, 500, 1000, or 2000 and/or not more than 40,000, 20,000, 10,000, or 5,000.

In certain embodiments, the flash suppressor 100 can have an internal volume of at least 5, 10, 14, or 16 cubic inches and/or not more than 40, 30, 25, or 20 cubic inches. Further, the flash suppressor 100 can have a length (typically measured as the height of the sidewall 104) that allows it to extend at least 2, 3, 4, or 5 inches and/or not more than 12, 10, 8, or 7 inches downwardly into the fuel container.

Figure 17:
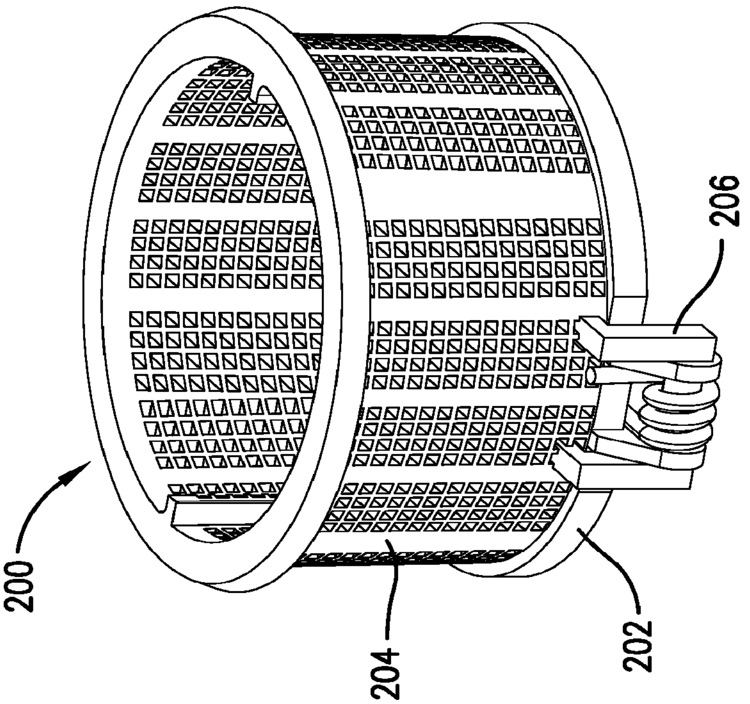
FIG. 17 is a top isometric view of a flash suppressor for integrating inside the neck of a portable fuel container having a bottom wall that is shiftable relative the sidewall, illustrating the bottom wall in a closed position.
Figure 19:
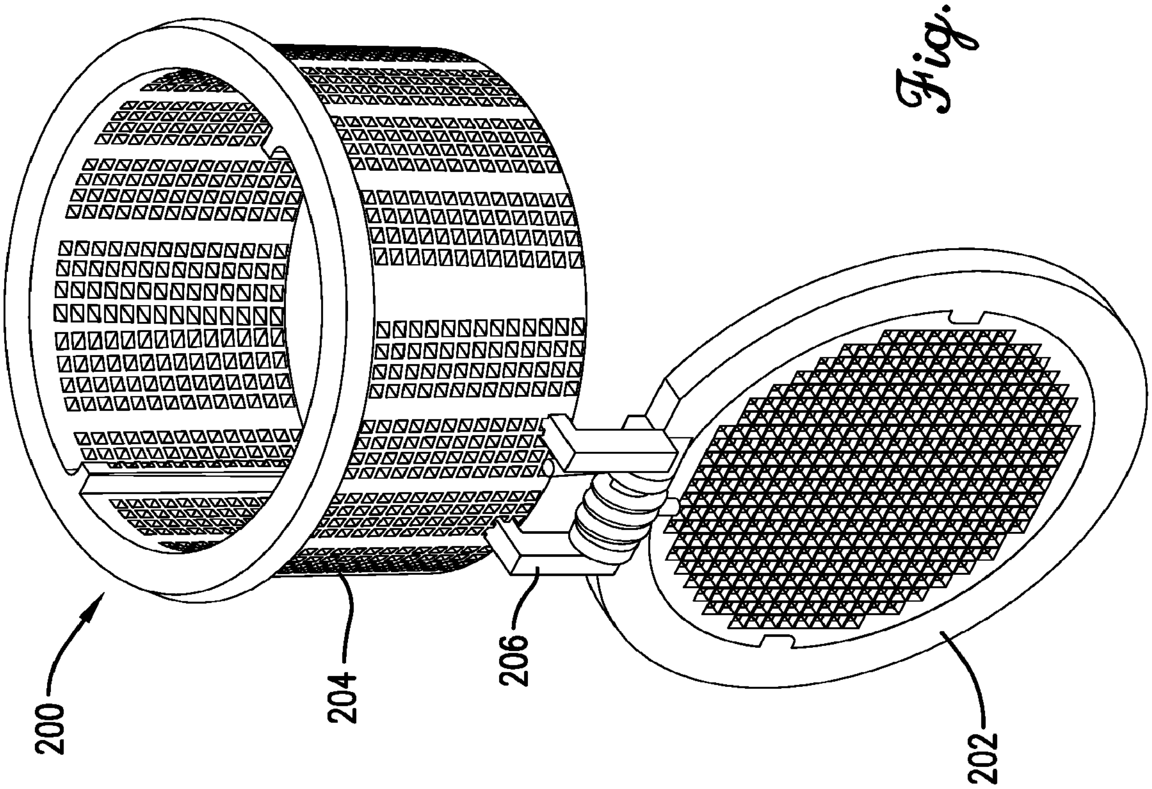
FIG. 19 is a top isometric view of the flash suppressor of FIG. 17, illustrating the bottom wall in an open position.
Figure 18:
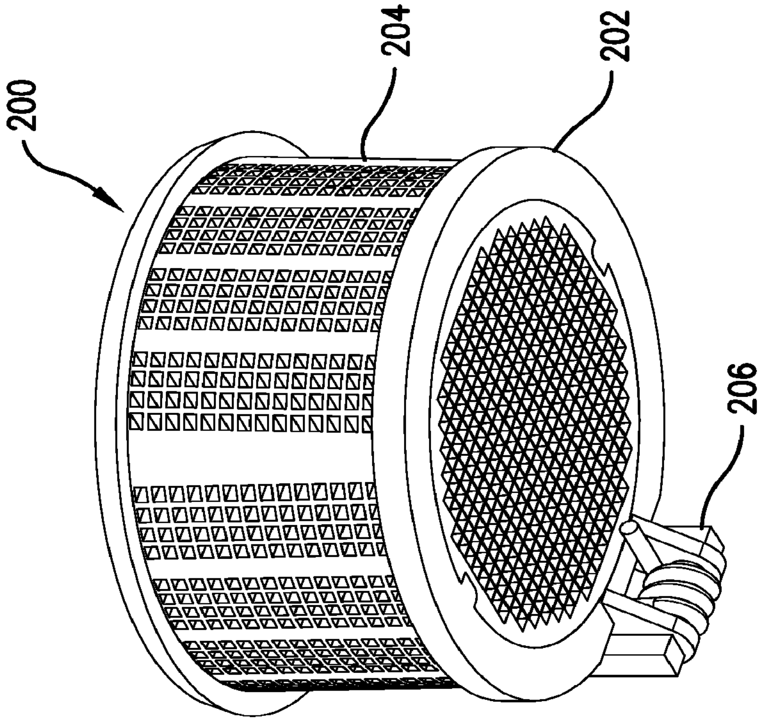
FIG. 18 is a bottom isometric view of the flash suppressor of FIG. 17, illustrating the bottom wall in a closed position.

The specific configuration (e.g., size, length, and shape) of the perforations 102 in the sidewall 104 and/or end wall 106 of the flash suppressor 100 can affect the ability of the perforations 102 to permit adequate fuel flow therethrough during filling and dispensing, while still permitting adequate fuel retention therein after dispensing. In certain embodiments, the perforations 102 can be sized to present an average perforation open area of at least 0.0005, 0.001, 0.0015, or 0.002 square inches and/or not more than 0.1, 0.05, 0.01, or 0.005 square inches. As used herein, "perforation open area" means the minimum cross sectional area of a perforation, measured normal to the direct of extension of the perforation through the wall. As used herein, "average perforation open area" means the average of all open areas of all perforations in the flash suppressor. The perforations 102 can have an average perforation diameter of at least 0.01, 0.02, 0.03, 0.04, or 0.05 and/or not more than 0.4, 0.2, 0.1, or 0.08 inches. As used herein, "perforation diameter" means the maximum dimension across a perforation, measured normal to the direct of extension of the perforation through the wall. As used herein, "average perforation diameter" means the average of all perforation diameters of all perforations in the flash suppressor. The length of each perforation 102 can be determined by the thickness of the walls (i.e., sidewall 104 and/or end wall 106) of the flash suppressor 100. In certain embodiments, the average length of the perforations 102 and/or the average thickness of the sidewall 104 and/or the end wall 106 can be least 0.01, 0.02, 0.04, 0.06, or 0.08 inches and/or not more than 0.25, 0.2, 0.15 or 0.1 inches FIGS. 17-19 show a flash suppressor 200 that is similar to the flash suppressor 100 depicted in FIG. 16 in that is does not include an imperforate fuel retention dam near its opening; however, the flash suppressor 200 of FIGS. 17-19 includes a bottom wall 202 that is shiftable relative to the sidewall 204 between an closed position (shown in FIGS. 17 and 18) and an open position (shown in FIG. 19). In certain embodiments, the bottom wall 202 is biased toward the closed position and the bottom wall 202 is configured to be shifted into the open position by contact with a conventional gasoline pump nozzle (not shown) that is inserted though the main opening of the portable fuel container for filling of the container. The bottom wall 202 can automatically shift into the closed position when the fuel pump nozzle is removed from the flash suppressor 200 and the main opening of the portable fuel container. The shiftable bottom wall 202 provides the necessary open area for filling the container with liquid fuel through the flash suppressor 200. In contrast with the flash suppressor 100 illustrated in FIG. 16, liquid fuel does not have to pass through the perforations in the sidewall 204 or the bottom wall 202 of flash suppressor 200 in order to fill the container with fuel. Such a configuration allows the sidewall 204 of the flash suppressor 200 to be much shorter than the sidewall 104 of the flash suppressor 100 depicted in FIG. 16.

As depicted in FIGS. 17-19 the flash suppressor 200 can include a spring biased hinge 206 coupling the bottom wall 202 to the sidewall 204 and providing for the shiftability and biasing of the bottom wall 202 relative to the sidewall 204. Of course, biasing mechanisms other than the torsion spring depicted in FIGS. 17-19 can be employed to bias the bottom wall 202 toward the closed position Referring again to FIGS. 17 and 18, because the end wall 20 of the flash suppressor 200 is closed during dispensing of liquid fuel from the container, the liquid fuel must flow through the perforations in the end wall 202 and/or sidewall 204 in order to dispense liquid fuel from the container. After liquid fuel is dispensed from the container and the flash suppressor 200 is no longer immersed in fuel, flash suppressor 200 retains a quantity of fuel in its perforations that is sufficient to cause the environment in the flash suppressor 200 to be too rich in fuel to support combustion. In order to retain fuel, the perforations of flash suppressor 200 can have substantially the same configuration (e.g., average perforation open area, average perforation diameter, and average perforation length) as the perforations of the flash suppressor 100 depicted in FIG. 16. However, the total number of perforations, internal volume, and sidewall height are substantially less than those of the flash suppressor 100 depicted in FIG. 16.

In certain embodiments, the total number or perforations in the flash suppressor 200 can be at least 25, 50, 100, or 250 and/or not more than 10,000, 5,000, 2,500, or 1,000. In certain embodiments, the flash suppressor 200 can have an internal volume of at least 2, 4, or 6 cubic inches and/or not more than 200, 15, 12, or 10 cubic inches. Further, the flash suppressor 200 can have a length (typically measured as the height of the sidewall 204) that allows it to extend at least 0.25, 0.5, 0.75 or 1 inch and/or not more than 4, 3, 2, or 1.5 inches downwardly into the fuel container.

For each of the portable fuel containers 10A, 10B, 10C, 10D and 10E, it is contemplated that provided that 10 ml of gasoline per 1 U.S. gallon (3.785 liters) capacity of the fuel container is retained within the portable fuel container, the fuel-air mixture within the portable fuel container will be too rich to support combustion within the portable fuel container. Moreover, it is believed that approximately 6 ml of gasoline per 1 U.S. gallon (3.785 liters) capacity of the fuel container is retained within the portable fuel container will be too rich to support combustion within the portable fuel container. This is linearly scalable to various sizes of portable fuel containers as defined herein. Thus, for a five gallon (18.927 liter) capacity portable fuel container, the neck dam alone, the absorbent pads alone, the pocket 36 alone, or the neck dam, pocket and absorbent pad(s) in any combination thereof will hold and retain at least 30 ml or at least 50 ml of gasoline within the portable fuel container 10. Thus, the size of the neck dam 26A or 26B, or the pocket 36, or the reservoir or pocket 86 formed by the body 12, rim 52 and imperforate fuel-retaining 64, or the absorbent pad(s) collectively should be sized corresponding to the volume capacity of the portable fuel container to retain the sufficient amount of fuel, in particular gasoline, described herein.

For the portable fuel containers 10A, 10B, 10C and 10E, a portion of the fuel 28 dispensed during pouring through the opening is retained immediately proximate the neck 22 and opening 24, thereby increasing the fuel-to-air ratio to a level whereby combustion may not occur. The positioning of the fuel retention structure in the neck proximate the opening 24 helps to inhibit the entry of flame into the chamber 25 of the container because the fuel is retained closely proximate the opening to maintain a too-rich mixture at the opening. For the portable fuel container 10D, the fuel is absorbed by the pads and retained in the chamber 25D within the main body 12D of the portable fuel container 10D to maintain the too rich fuel-air ratio for combustion. The portable fuel container 10E provides, in addition to the increased fuel-air ratio caused by the retention of fuel in the reservoir 86 or pocket, a barrier to the passage of spark or flame attempting to enter the chamber 25 by the suppressor sidewall 54 and bottom wall 56. The method hereof includes the steps of pouring fuel through the opening of a portable fuel container, and retaining a portion of the fuel in a retention member such as an absorbent pad or in a reservoir positioned proximate the opening so as to increase the ratio of fuel to air interiorly of the container, preferably proximate the opening.

The invention claimed is:

1. A flash suppressor for use in an opening of a fuel container, the flash suppressor comprising:

an annular rim;

a bottom wall; and a sidewall extending downwardly from the annular rim to the bottom wall, wherein the sidewall defines a plurality of perforations;

wherein:

the flash suppressor is comprised of a synthetic resin material;

the flash suppressor is at least 10 percent open and not more than 80 percent open; and the flash suppressor is configured such that, when the flash suppressor is positioned proximate to the opening of the fuel container and a liquid fuel is dispensed from the container through the plurality of perforations and the opening and the flash suppressor is no longer submerged in the liquid fuel, a quantity of the liquid fuel is retained by the plurality of perforations, the quantity of the liquid fuel being sufficient to provide a fuel-air mixture that is too rich to support combustion within the flash suppressor.

2. The flash suppressor of claim 1, wherein the bottom wall defines a plurality of perforations.

3. The flash suppressor of claim 1, wherein the sidewall comprises perforated regions and non-perforated regions.

4. The flash suppressor of claim 1, wherein the sidewall is generally cylindrical.

5. The flash suppressor of claim 1, wherein the sidewall is tapered inwardly from the rim to the bottom wall.

6. The flash suppressor of claim 1, wherein the flash suppressor is comprised of polyethylene or polypropylene.

7. The flash suppressor of claim 1, wherein the flash suppressor is comprised of a synthetic resin material which is resistant to degradation by exposure to the liquid fuel.

8. The flash suppressor of claim 1, wherein the flash suppressor is configured to allow the liquid fuel to flow through the plurality of perforations and into the fuel container at a rate of at least five gallons per minute.

9. The flash suppressor of claim 1, wherein the flash suppressor is configured to allow the liquid fuel to flow through the plurality of perforations and into the fuel container at a rate of at least 7.5 gallons per minute.

10. The flash suppressor of claim 1, wherein the flash suppressor is configured to receive a fuel pump nozzle inserted through the opening.

11. The flash suppressor of claim 1, wherein the plurality of perforations retain at least 6 milliliters of fuel in the plurality of perforations.

12. The flash suppressor of claim 1, wherein the quantity of the liquid fuel retained by the plurality of perforations prevents combustion by causing the environment in the flash suppressor to be too rich in fuel to support combustion.

13. The flash suppressor of claim 1, wherein the retained quantity of the liquid fuel is held in the perforations by intermolecular forces between the flash suppressor and the fuel.

14. The flash suppressor of claim 1, the flash suppressor has an internal volume of at least 2 cubic inches and not more than 20 cubic inches, wherein the average length of the perforations is at least 0.02 inches and not more than 0.25 inches.

15. The flash suppressor of claim 14, wherein the flash suppressor extends at least 3 inches and not more than 12 inches downwardly into the fuel container, wherein the flash suppressor has an internal volume of at least 3 cubic inches and not more than 20 cubic inches.

16. The flash suppressor of claim 1, wherein the flash suppressor has an internal volume of at least 4 cubic inches and not more than 20 cubic inches, wherein the average open area of the perforations is at least 0.001 and not more than 0.05 square inches, wherein the total number of perforations is at least 100 and not more than 10,000, wherein the average length of the perforations is at least 0.02 inches and not more than 0.25 inches.

17. The flash suppressor of claim 16, wherein the average open area of the perforations is at least 0.002 and not more than 0.05 square inches and wherein the flash suppressor is at least 20 percent open and not more than 60 percent open.

18. The flash suppressor of claim 1, wherein the total number of perforations is at least 250 and not more than 5,000.

19. The flash suppressor of claim 1, wherein the average length of the perforations is at least 0.04 inches and not more than 0.25 inches.

20. The flash suppressor of claim 1 wherein the bottom wall has one or more flat surfaces.

21. A flash suppressor for use in an opening of a fuel container, the flash suppressor comprising:

an annular rim;

a bottom wall; and a sidewall extending downwardly from the annular rim to the bottom wall, wherein the sidewall defines a plurality of perforations;

wherein:

the flash suppressor is at least 10 percent open and not more than 80 percent open;

the flash suppressor is configured such that, when the flash suppressor is positioned proximate to the opening of the fuel container and a liquid fuel is dispensed from the container through the plurality of perforations and the opening and the flash suppressor is no longer submerged in the liquid fuel, a quantity of the liquid fuel is retained by the plurality of perforations, the quantity of the liquid fuel being sufficient to provide a fuel-air mixture proximate to the opening of the fuel container that is too rich to support combustion within the flash suppressor; and the flash suppressor consists essentially of an injection molded synthetic resin material.

22. A flash suppressor for use in an opening of a fuel container, the flash suppressor comprising:

an annular rim;

a bottom wall; and a sidewall extending downwardly from the annular rim to the bottom wall, wherein the sidewall defines a plurality of perforations including perforations adjacent the annular rim;

wherein:

the flash suppressor consists essentially of an injection molded synthetic resin material the flash suppressor is at least 10 percent open and not more than 80 percent open; and the flash suppressor is configured such that, when the flash suppressor is positioned proximate to the opening of the fuel container and a liquid fuel is dispensed from the container through the plurality of perforations and the opening and the flash suppressor is no longer submerged in the liquid fuel, a quantity of the liquid fuel is retained by the plurality of perforations, the quantity of the liquid fuel being sufficient to provide a fuel-air mixture proximate to the opening of the fuel container that is too rich to support combustion within the flash suppressor.

23. The flash suppressor of claim 22, wherein the flash suppressor is at least 15 percent open and not more than 80 percent open.

24. The flash suppressor of claim 1, wherein the flash suppressor is at least 15 percent open and not more than 80 percent open.

25. The flash suppressor of claim 21, wherein the flash suppressor is at least 15 percent open and not more than 80 percent open.

* * * * *